United States Patent
Zhu et al.

(10) Patent No.: US 8,062,725 B2
(45) Date of Patent: *Nov. 22, 2011

(54) LOW ORGANIC VAPOR PERMEATION RESIN

(75) Inventors: Jin Zhu, Ningbo (CN); Nishant Satish Negandhi, Medina, OH (US)

(73) Assignee: Ovetion Polymer Technology and Engineered Materials, Inc., Medina, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/035,787

(22) Filed: Feb. 25, 2011

(65) Prior Publication Data

US 2011/0151165 A1 Jun. 23, 2011

Related U.S. Application Data

(63) Continuation-in-part of application No. 12/838,549, filed on Jul. 19, 2010, now abandoned, which is a continuation of application No. 11/445,113, filed on Jun. 1, 2006, now Pat. No. 7,771,805.

(60) Provisional application No. 60/686,315, filed on Jun. 1, 2005.

(51) Int. Cl.
  *B32B 27/08* (2006.01)
  *B32B 27/34* (2006.01)
  *B32B 27/36* (2006.01)
  *B65D 6/40* (2006.01)
  *B65D 8/18* (2006.01)

(52) U.S. Cl. ............. 428/35.7; 428/34.1; 428/36.6; 428/36.92; 220/601; 220/678

(58) Field of Classification Search ............. 428/34.1, 428/35.2, 35.5, 35.7, 35.8, 35.9, 36.1, 36.4, 428/36.5, 36.6, 36.7, 36.8, 36.9, 36.91, 36.92; 206/601, 610, 612, 613, 661, 677, 678, 679
See application file for complete search history.

(56) References Cited

U.S. PATENT DOCUMENTS

| | | | |
|---|---|---|---|
| 4,603,193 A | 7/1986 | Richardson et al. |
| 4,617,342 A | 10/1986 | Poppe et al. |
| 5,129,544 A | 7/1992 | Jacobson et al. |
| 5,175,238 A | 12/1992 | Matlack et al. |

(Continued)

FOREIGN PATENT DOCUMENTS

EP 0742236 B1 2/2002

OTHER PUBLICATIONS

First Office Action on the Merits to Related U.S. Appl. No. 11/445,113, Mailed to Applicants Feb. 2, 2010.

(Continued)

*Primary Examiner* — Walter B Aughenbaugh
(74) *Attorney, Agent, or Firm* — Edwin A. Sisson, Attorney at Law, LLC

(57) ABSTRACT

The invention relates to a novel composition comprising at least one polyphthalamide reactively extruded with at least one other polyamide, a polyester, and a modifier. The composition can be further modified with fillers to add increased strength. Other additives such as colorants, flame retardants, and UV degradation inhibitors are also contemplated. This composition exhibits superior barrier to organic vapors, impact strength and heat distortion temperatures. Also disclosed are articles using this novel composition such as fuel tanks for gasoline engines used to power lawn mowers and garden machinery.

19 Claims, 4 Drawing Sheets

U.S. PATENT DOCUMENTS

| | | |
|---|---|---|
| 5,194,577 A | 3/1993 | Chen |
| 5,387,645 A | 2/1995 | Montag et al. |
| 5,441,781 A | 8/1995 | Urchida et al. |
| 5,547,096 A | 8/1996 | Kleyn et al. |
| 6,177,162 B1 | 1/2001 | Siour et al. |
| 6,409,040 B1 | 6/2002 | Distelhoff et al. |
| 6,719,163 B1 | 4/2004 | Delbarre et al. |
| 6,893,055 B2 | 5/2005 | Thomas et al. |
| 7,771,805 B1 * | 8/2010 | Negandhi et al. ............ 428/35.7 |
| 2003/0198768 A1 | 10/2003 | Delbarre et al. |
| 2005/0244706 A1 | 11/2005 | Wu et al. |

OTHER PUBLICATIONS

Applicants Response to First Office Action on the Merits to Related U.S. Appl. No. 11/445,113, Mailed to Applicants Feb. 2, 2010; Response submitted Apr. 30, 2010.

* cited by examiner

LOW ORGANIC VAPOR PERMEATION RESIN

PRIORITIES AND CROSS REFERENCES

This patent application is a continuation in part of U.S. Non-Provisional patent application Ser. No. 12/838,549, filed on 19 Jul. 2010 now abandoned, the entire teachings of which are incorporated herein, which is a continuation application of U.S. Non-Provisional patent application Ser. No. 11/445,113, now U.S. Pat. No. 7,771,805 filed on 1 Jun. 2006 all of which claim priority from U.S. Provisional Patent Application No. 60/686,315 titled, LOW ORGANIC VAPOR PERMEATION RESIN COMPOSITION, filed Jun. 1, 2005.

FIELD

This invention relates to compatibilized thermoplastic blends comprising polyphthalamide and an aromatic polyester used for molded articles requiring high barrier to organic vapors.

BACKGROUND

In the automotive industry polymeric fuel containers are being used because they can be manufactured in a cost-efficient manner, are of high mechanical stability and readily deformable in accidents, and greatly inhibit hydrocarbon permeation. The best results as to the overall qualities of the polymeric fuel containers have been obtained by a six-layer so-called COEX-structure. This is a multi-layer system manufactured in a single process (co-extrusion) and including two layers of high density polyethylene (HDPE) which enclose a barrier-layer of an ethylene vinyl alcohol copolymer (EVOH) and a layer of treated, recycled or "re-grind" plastic material.

The EVOH-layer, which is not directly connectable to the HDPE, has an adhesive layer provided on both of its sides for connection to the adjacent layers so that the total structure comprises six layers. The layer of recycled or re-grind material is of a thickness which is about 35 to 45% of the total thickness of the fuel container wall and consists of a mixture of scrap materials resulting from the manufacturing of containers, i.e. it is both of HDPE and of EVOH. While HDPE is cheap and has good mechanical characteristics, it is a poor barrier against permeation of hydrocarbons. This is why the relatively thin EVOH-layer is used, which while being expensive, is an excellent barrier against permeation of hydrocarbons. Additional techniques include fluorinating the polyethylene to make it inherently more impermeable to fuel vapors.

Presently, the State of California generally has the most stringent requirements for the reduction of total vehicle hydrocarbon emissions. As a general rule the other states in the U.S. and many other countries will adopt the Californian regulations after some time. Under the provisions of such future regulations the level of total vehicle hydrocarbon permeation must not exceed 0.5 g per day. To achieve this level, it has been estimated that the hydrocarbon emissions from the vehicle fuel system must not be more than 150 mg per day, which would result in a static permeation of less than 55 mg per day when production and durability parameters are considered. However, the fuel container is only a part of the total fuel system, and further estimates have shown that permeation through the container wall should not exceed 5 mg per day in order to meet the above requirements. The above described typical six-layer COEX-structure, however, only provides permeation levels of about 20 mg or less per day.

One possibility to improve the performance of the six-layer COEX-structure would be to increase the thickness of the EVOH-layer from about 150 micrometers to about 1.0 mm. Apart from substantially increased costs this would cause production problems and deteriorate the mechanical properties of the fuel container because EVOH has relatively poor impact resistance. This structure also has a permeation window which results when the two wall halves are welded together by pinching under heat.

U.S. Pat. No. 6,719,163 teaches eliminating the 6 layer co-extruded structure and its associated permeation window, with a multilayer structure containing two separately manufactured halves with the barrier layer on the outside of the structure. U.S. Pat. No. 6,719,163 teaches the layers of its fuel tank be made of high density polyethylene and a compound impermeable to fuel such as ethyl vinyl alcohol (EVOH).

European Patent EP 742 236 describes petrol tanks consisting of five layers which are, respectively: high density polyethylene (HDPE); a binder; a polyamide (PA) or a copolymer containing ethylene units and vinyl alcohol units (EVOH); a binder; and HDPE.

A sixth layer can be added between one of the layers of binder and one of the HDPE layers. This sixth layer consists of manufacturing scraps following molding of the tanks, and to a much smaller extent of non-compliant tanks. These scraps and non-compliant tanks are then ground until granules are obtained. This ground material is then re-melted and extruded directly at the tank co-extrusion plant. This ground material may also be melted and re-granulated by means of an extruding machine such as a twin-screw extruder, before being reused.

According to one variant, the recycled product can be mixed with the HDPE from the two extreme layers of the tank. It is possible, for example, to mix the granules of recycled product with granules of virgin HDPE of these two layers. It is also possible to use any combination of these two recyclings. The content of recycled material can represent up to 50% of the total weight of the tank.

European Patent EP 731 308 describes a tube comprising an inner layer comprising a mixture of polyamide and of polyolefin with a polyamide matrix and an outer layer comprising a polyamide. These tubes based on polyamide are useful for transporting petrol and more particularly for bringing the petrol from the motor vehicle tank to the motor and also, but in larger diameter, for transporting hydrocarbons in service stations between the distribution pumps and the underground storage tanks According to another form of the tube, a layer of a polymer comprising ethylene units and vinyl alcohol units (EVOH) can be placed between the inner and outer layers. The structure: inner layer/EVOH/binder/outer layer is advantageously used.

The tanks described in EP 742 236 which do not have the barrier layer in direct contact with the petrol do admittedly have barrier properties, but they are not sufficient when very low petrol losses are desired. EP 731 308 describes tubes whose outer layer is made of polyamide and the barrier layer is in direct contact with the petrol, wherein the layer made of polyamide is necessary for the mechanical strength of the assembly.

United States Patent Application No. 20030198768 proposes a plastic fuel tank having a multilayer wall structure, wherein a barrier layer forms an exposed face of the wall and preferably is in direct contact with the fuel contained therein. The barrier layer of the structures of the invention constitutes one of the exposed faces of the structure, i.e. it is not an interior layer of the wall structure. Fuel tank structures embodying the invention have walls with HDPE/barrier layer or HDPE/binder/barrier layer, in which "HDPE" denotes high density polyethylene.

The preferred fuel tank of United States Patent Application No. 20030198768, comprises successively: a first layer of high density polyethylene (HDPE), a layer of binder, a second layer of EVOH or of a mixture based on EVOH, and optionally a third layer of polyamide (A) or a mixture of polyamide (A) and polyolefin (B).

The polyamides proposed in United States Patent Application No. 20030198768 are those in which the term "polyamide" means the following products of condensation of one or more amino acids, such as aminocaproic acid, 7-aminoheptanoic acid, 11-aminoundecanoic acid and 12-aminododecanoic acid of one or more lactams such as caprolactam, oenantholactam and lauryllactam; and of one or more salts or mixtures of diamines such as hexamethylenediamine, dodecamethylenediamine, meta-xylylenediamine, bis(p-aminocyclohexyl)methane and trimethylhexamethylenediamine with diacids such as isophthalic acid, terephthalic acid, adipic acid, azelaic acid, suberic acid, sebacic acid and dodecanedicarboxylic acid.

As examples of polyamides, United States Patent Application No. 20030198768 mentions PA 6 and PA 6-6 and copolyamides. United States Patent Application No. 20030198768 also mentions copolyamides resulting from the condensation of at least two α,ω-aminocarboxylic acids or of two lactams or of one lactam and one α,ω-aminocarboxylic acid. Also included in United States Patent Application No. 20030198768 are the copolyamides resulting from the condensation of at least one α,ω-aminocarboxylic acid (or a lactam), at least one diamine and at least one dicarboxylic acid.

United States Patent Application No. 20030198768 prefers lactams containing from 3 to 12 carbon atoms on the main ring and which can be substituted. Examples of such lactams are β,β-dimethylpropiolactam, α,α-dimethylpropiolactam, amylolactam, caprolactam, capryllactam and lauryllactam.

Aminoundecanoic acid and aminododecanoic acid are examples of α,ω-aminocarboxylic acids and adipic acid, sebacic acid, isophthalic acid, butanedioic acid, 1,4-cyclohexanedicarboxylic acid, terephthalic acid, sodium or lithium salts of sulphoisophthalic acid, dimerized fatty acids (these dimerized fatty acids have a dimer content of at least 98% and are preferably hydrogenated) and dodecanedioic acid HOOC—(CH$_2$)$_{10}$—COOH are examples of dicarboxylic acids.

The diamine noted in United States Patent Application No. 20030198768 can be an aliphatic diamine containing from 6 to 12 atoms and can be arylic and/or saturated cyclic. Hexamethylenediamine, piperazine, tetramethylenediamine, octamethylenediamine, decamethylenediamine, dodecamethylenediamine, 1,5-diaminohexane, 2,2,4-trimethyl-1,6-diaminohexane, diaminepolyols, isophoronediamine (IPD), methylpentamethylenediamine (MPDM), bis(aminocyclohexyl)methane (BACM) and bis(3-methyl-4-aminocyclohexyl)methane (BMACM) are examples of such diamines.

Copolymers of caprolactam and of lauryllactam (PA 6/12), copolymers of caprolactam, of adipic acid and of hexamethylenediamine (PA 6/6-6), copolymers of caprolactam, of lauryllactam, of adipic acid and of hexamethylenediamine (PA 6/12/6-6), copolymers of caprolactam, of lauryllactam, of 11-aminoundecanoic acid, of azelaic acid and of hexamethylenediamine (PA 6/6-9/11/12), copolymers of caprolactam, of lauryllactam, of 11-aminoundecanoic acid, of adipic acid and of hexamethylenediamine (PA 6/6-6/11/12) and copolymers of lauryllactam, of azelaic acid and of hexamethylenediamine (PA 6-9/12) are examples of copolyamides. The problem with the use of most polyamides is high shrinkage from the mold. Polyamides also present a problem of high moisture absorption which can result in broken seals at the welds and seams of the two halves of the fuel tank.

U.S. Pat. No. 5,441,781 teaches a multi-layer plastic fuel tank comprising (A) a gas barrier layer having on at least one side thereof (B) an adhesive layer and further thereon (C) a high-density polyethylene layer, the gas barrier layer (A) comprising a resin having gas barrier properties, the adhesive layer (B) comprising a resin having adhesiveness to both of the gas barrier layer (A) and the high-density polyethylene layer (C), the high-density polyethylene layer (C) comprising high-density polyethylene having an intrinsic viscosity of from 2 to 6 dl/g, a density of from 0.940 to 0.970 g/cm$^3$, and a zero shear viscosity of from $2.0 \times 10^7$ to $1.0 \times 10^8$ poise at 190° C.

The multi-layer plastic fuel tank according to U.S. Pat. No. 5,441,781 comprises gas barrier layer (A) having laminated on at least one side thereof high-density polyethylene layer (C) via adhesive layer (B).

Resins with gas barrier properties are used in gas barrier layer (A). Examples include a modified polyamide composition comprising a mixture of (1) an α,β-unsaturated carboxylic acid-modified ethylene-α-olefin copolymer prepared by grafting an α,β-unsaturated carboxylic acid or a derivative thereof to an ethylene-. α-olefin copolymer at a grafting ratio of from 0.05 to 1% by weight, preferably from 0.2 to 0.6% by weight, based on the ethylene-. α-olefin copolymer and (2) a polyamide. The ethylene-α-olefin copolymer, preferably has a degree of crystallinity of from 1 to 35%, more preferably from 1 to 30%, and a melt index of from 0.01 to 50 g/10 min, more preferably from 0.1 to 20 g/10 min. Examples of the α,β.-unsaturated carboxylic acid or a derivative thereof include monocarboxylic acids, such as acrylic acid and methacrylic acid, their derivatives, dicarboxylic acids, such as maleic acid, fumaric acid and citraconic acid, and their derivatives. Preferred examples of the α,β-unsaturated carboxylic acid or a derivative thereof include maleic anhydride.

Examples of the α-olefins in the ethylene-α-olefin copolymer (1) include propylene, butene-1, hexene-1, etc. The α-olefin is generally copolymerized with ethylene at a ratio of not more than 30% by weight, and preferably from 5 to 20% by weight, based on the total amount of the copolymer.

The polyamide (2) generally has a relative viscosity of from about 1 to 6. Examples of the polyamide include polyamides obtained by polycondensation of a diamine and a dicarboxylic acid, polyamide obtained by polycondensation of an aminocarboxylic acid, polyamide obtained by polycondensation of a lactam, and copolyamide thereof.

Examples of the diamine includes aliphatic, alicyclic or aromatic diamines, such as hexamethylenediamine, decamethylenediamine, dodecamethylenediamine, trimethylhexamethylenediamine, 1,3-bis(aminomethyl)cyclohexane, 1,4-bis(aminomethyl)cyclohexane, bis(p-aminocyclohexylmethane), m-xylylenediamine, and p-xylylenediamine. Examples of the dicarboxylic acid includes aliphatic, alicyclic or aromatic dicarboxylic acids, such as adipic acid, suberic acid, sebacic acid, cyclohexanedicarboxylic acid, terephthalic acid, and isophthalic acid. Examples of the aminocarboxylic acid includes ε-aminocaproic acid and 11-aminoundecanoic acid. Examples of the lactam includes ε-caprolactam and .ε-laurolactam.

Specific examples of the polyamide include nylon 6, nylon 66, nylon 610, nylon 9, nylon 11, nylon 12, nylon 6/66, nylon 66/610, and nylon 6/11.

From the standpoint of moldability, a polyamide having a melting point of from 170 to 280° C., and particularly from 200 to 240° C., is typical. Nylon 6 is quite suitable for the use.

The α,β-unsaturated carboxylic acid-modified ethylene-α.-olefin copolymer is generally mixed with the polyamide in an amount of from 10 to 50 parts by weight, and preferably from 10 to 30 parts by weight, per 100 parts by weight of the polyamide.

Other solutions to increasing the barrier of fuel tanks can be found in U.S. Pat. No. 5,129,544 which teaches a laminate structure with a chemical resistant layer such as nylon 12 and Teflon. U.S. Pat. No. 5,547,096 teaches a fuel tank of an inner and outer shell where the outer shell is electroplated with successive layers of copper, nickel and chrome. U.S. Pat. No. 6,409,040 teaches injection molding two halves where the barrier layer is formed on the outer wall as a coat of paint.

There therefore exists, the need for a single composition which can be used as a monolayer or as a barrier layer in the multilayer structure which is impermeable to fuel vapors and has the necessary mechanical strength to function as a fuel container.

SUMMARY

This invention relates to a thermoplastic resin comprising an aromatic polyester, a polyphthalamide and a compatibilizer. More specifically, the aromatic polyester is selected from the group consisting of polybutylene terephthalate, polyethylene terephthalate, polytrimethylene terephthalate, polyethylene naphthalate, and polybutylene naphthalate. The compatibilizer has at least one functional group selected from the group consisting of hydroxyl groups, carboxylic acid groups, glycidyl groups, maleic anhydride groups, amino groups, siloxane groups or isocyanato groups. More specifically the composition may further comprise a second polyamide selected from the group consisting of aliphatic polyamides and partially aromatic polyamides.

Also disclosed is a fuel tank having a contained volume wherein said fuel tank is comprised of at least one wall, an inlet, an outlet, wherein the wall is comprised of the thermoplastic composition mentioned above and the wall is of monolayer construction.

The container also is used for organic liquids having a contained volume wherein said container is comprised of at least one wall, wherein said container is connected with an energy conversion device in such a manner that organic liquid stored in the container is capable of being transferred from the container to the energy conversion device and wherein the wall is comprised of a thermoplastic composition specified.

DETAILED DESCRIPTION

Figure 1:
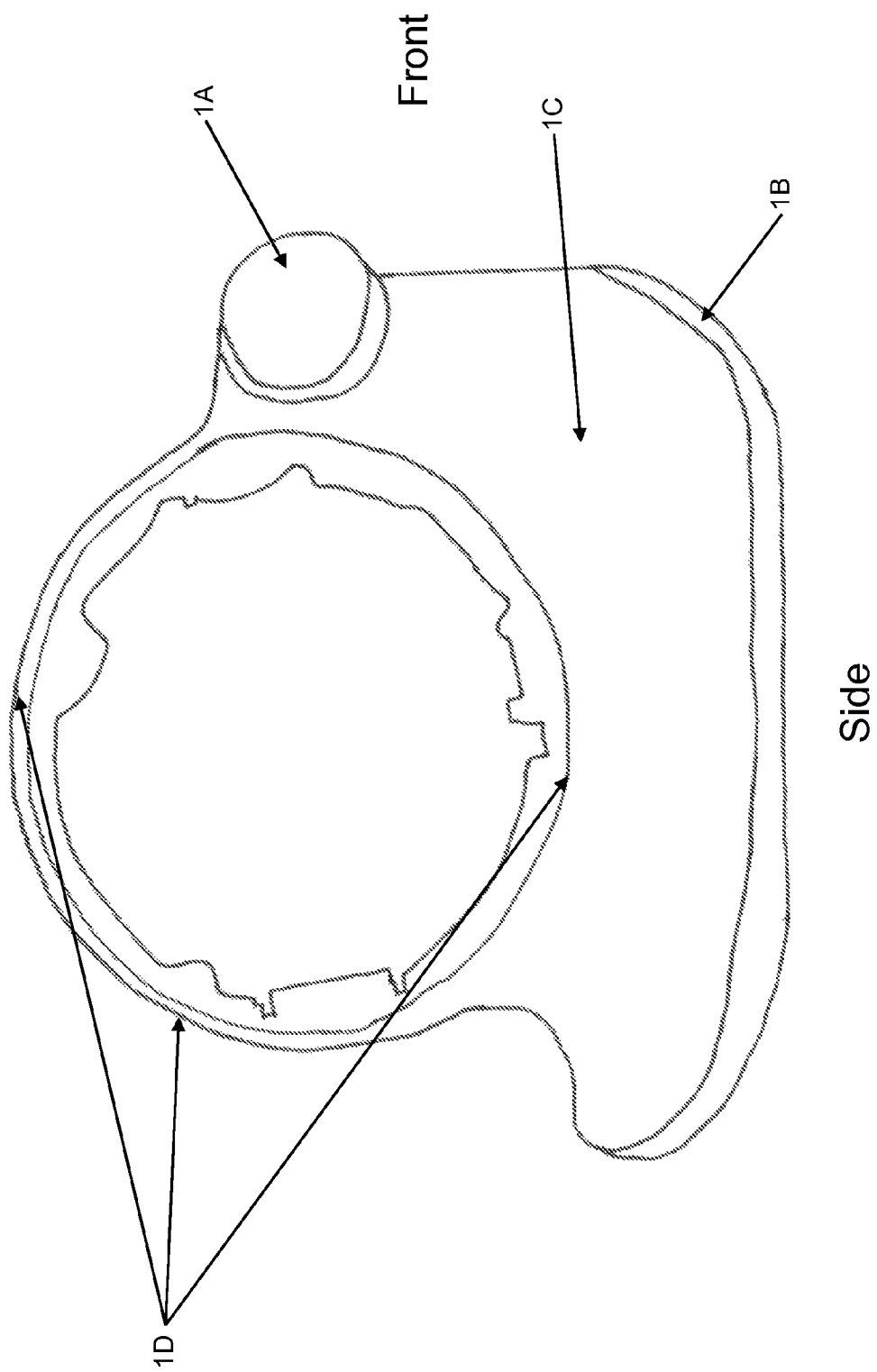
FIG. 1 depicts a representative fuel tank as viewed from the top view.

This specification describes a novel composition made by reactively extruding at least one polyphthalamide with, at least one aromatic polyester, at least one compatibilizer, and optionally another polyamide which is partially aromatic or aliphatic and up to 70 weight percent of at least one filler which may or may not provide reinforcing properties. The properties of this composition when formed into a fuel container provide the necessary strength and improved barrier properties to make it a good material for fuel tanks Polyamides suitable for this invention can be described as comprising the reaction product of amino caproic acid with itself or a repeating unit A-D, wherein A is the residue of a dicarboxylic acid comprising adipic acid, isophthalic acid, terephthalic acid, 1,4-cyclohexanedicarboxylic acid, resorcinol dicarboxylic acid, or naphthalenedicarboxylic acid and D is a residue of a diamine comprising m-xylylene diamine, p-xylylene diamine, hexamethylene diamine, ethylene diamine, para-phenylenediamine or 1,4 cyclohexanedimethylamine, or mixtures thereof. These polyamides can range in number average molecular weight from 2,000 to 60,000 as measured by end-group titration.

Whether a polyamide is aliphatic, partially aromatic or fully aromatic depends upon the nature of the acid and diamine. If both are aliphatic, then the subsequent polymer is an aliphatic polyamide. The reaction product of adipic acid, (an aliphatic dicarboxylic acid) and hexamethylene diamine is the well known aliphatic polyamide called Nylon 66. If the acid and diamine contain aliphatic and aromatic constituents, the resulting polymer is considered partially aromatic. The reaction product of adipic acid and m-xylylene diamine is a partially aromatic polyamide known as nylon MXD-6. If both the acid and diamine are aromatic, then the resulting polymer is an aromatic polyamide.

The aromatic polyamides that can be utilized in the practice of this invention are made by condensation polymerization wherein an aromatic dicarboxylic acid is reacted with an aromatic diamine. A suitable aromatic polyamide is polyphthalamide (PPA). In its generic sense, the polyphthalamide is the reaction product of a phthalate with a diamine. Examples of the phthalates are terephthalate (terephthalic acid), isophthalate (isophthalic acid), or orthophthalate. A preferred polyphthalamide can be made by the polymerization of terephthalic acid with para-phenylenediamine. Polyphthalamide is a semi-crystalline polymer that can be represented by the structural formula:

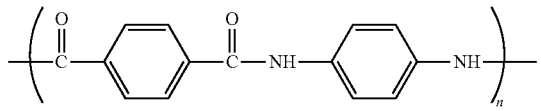

wherein n is an integer that represents the number of repeat units in the polymer.

Although not a phthalate, the use of 2,6 naphthalate (naphthalate dicarboxylic acid) is also contemplated.

U.S. Pat. No. 4,603,193, the teachings of which are incorporated herein, describes a salt process to manufacture polyphthalamides. That process comprises preparing a salt of an aliphatic or aromatic diamine or a mixture of these and di, tri or tetracarboxylic acid, a mixture of these or their corresponding anhydrides by reacting both feedstocks at a temperature of about 375° F. to about 450° F. in an aqueous medium provided the water content of the resulting solution is kept below 25% water by weight. The resulting salt solution is subjected to a pressure of about 1500 to about 3000 psig and is then passed through a preheat zone where the temperature is increased from about 425° F. to about 625° F., the total residence time is kept about 25 to about 50 seconds, the reactants then are flashed through a control valve or nozzle to give an aerosol mist at a pressure of about 0 to about 400 and melt temperatures of about 500° F. to about 750° F. The total residence time in the reactor being about 0.1 to about 20 seconds. The polymer is then injected onto the screws of a twin screw reactor. The residence time in the extruder is about 45 seconds to about 3 minutes.

Examples of polymers manufactured by the salt process are the polyamides prepared from hexamethylene diamine and terephthalic acid, isophthalic acid and adipic acid in the mole ratio of about 100:65:25:10; to about 100:85:5:10; and the polyamides which are prepared from hexamethylene diamine, terephthalic acid and isophthalic acid in the mole ratio of about 100:30:70 to about 100:90:10.

U.S. Pat. No. 5,175,238, the teachings of which are incorporated herein, describes one composition of high barrier polyphthalamide as having a molar ratio of isophthalic acid/terephthalic acid/adipic acid/metaxylylenediamine/hexamethylenediamine in the range of 30-5/0-15/20-30/30-20/30-20.

Polyphthalamide is commercially available from Solvay Advanced Polymers and is sold as Amodel® PPA. The Amodel® grades of 1002 and 1006 differ in that the 1002 has a polyolefin impact modifier, the other is neat.

U.S. Pat. No. 5,194,577 states that polyphthalamides can be prepared from the appropriate starting materials, e.g., a dicarboxylic acid component comprising terephthalic acid and adipic acid, or their derivatives, and a diamine component comprising meta-xylylene diamine and a divalent straight-chain or cyclic aliphatic diamine of about 4 to about 20 carbon atoms having up to one methyl substituent per carbon atom, preferably hexamethylene or octamethylene diamine and derivatives thereof, in suitable proportions by any suitable means. The dicarboxylic acid component and diamine component are used in essentially stoichiometric quantities although a slight excess of either, e.g., up to about 10 mole percent, can be used to account for loss of reactants or to provide final products with a predominance of acid or amine end groups as desired. One suitable preparation involves a salt preparation step, preferably conducted batchwise to achieve proper stoichiometry, wherein dicarboxylic acid and diamine components and solvent are added to a suitable reaction vessel in appropriate amounts and maintained under conditions effective to cause salt formation but avoid appreciable conversion of salts to oligomers. Water is a preferred solvent and temperature is preferably maintained below about 120° C. to minimize conversion. Product of the salt preparation step can be introduced into a condensation section operated either batchwise or continuously. In the condensation section substantial conversion of salts to polymer takes place. The condensation product then typically is introduced into a finishing section, such as a twin-screw extruder, to obtain further conversion and increase inherent viscosity from a level of about 0.1 to about 0.6 dl/g typically achieved in the condensation section up to about 0.8 dl/g or greater. The polymeric product can be recovered from the finishing section and, for example, pelletized or mixed with fillers, additives and the like. Other suitable methods for preparation of such polyphthalamides by a process particularly suited for high melting polyamides. The process of the latter comprises forming an essentially homogeneous mixture of polyamide-forming starting materials, transferring the mixture to a heated preflash zone under pressure, passing the heated, pressurized mixture through an orifice into a zone of lower pressure and high heat flux to form an aerosol mist of reactants, passing the aerosol mist through the zone of high heat flux at low residence time and passing the resulting product to a finishing reactor to increase conversion thereof.

U.S. Pat. No. 4,603,166, the teachings of which are incorporated herein, describes how to make polyphthalamides in either a batch or continuous process. The patent also teaches how to compound the polyphthalamides as well.

U.S. Pat. No. 4,617,342, the teachings of which are incorporated herein, describes a crystalline polyamide which has improved tensile strength and which has a heat deflection temperature in excess of 240° C. when filled is formed from dicarboxylic acid compounds comprising compounds of terephthalic acid and isophthalic acid in a molar ratio of at least 80:20 to about 99:1 and diamines comprising hexamethylene diamine and trimethylhexamethylene diamine in a molar ratio of about 98:2 to about 60:40.

The polyesters useful in the composition are the polycondensation reactions of at least one dicarboxylic acid, or its dimethyl ester, with a di-alcohol. Suitable polyesters are the aromatic polyesters such as polyethylene terephthalate, also known as PET, made from the reaction of terephthalic acid with ethylene glycol, polybutylene terephthalate, also known as PBT, which is the reaction product of terephthalic acid with 1,4 butane diol, and poly(trimethylene terephthalate), also known as PTT, which is the reaction product of terephthalic acid with 1,3 propane diol. PET, PBT, and PTT are available from many suppliers in many grades, usually modified by adding at least one additional co-monomer. The co-monomer could be another alcohol, such as diethylene glycol or cyclohexane dimethanol, or dicarboxylic acid, or both. Therefore, the phrase polyethylene terephthalate, polyethylene naphthalate, polybutylene naphthalate, polyethylene isophthalate, polybutylene isophthalate, polybutylene terephthalate, poly(trimethylene terephthalate), poly(trimethylene isophthalate), and poly(trimethylene naphthalate) include the homopolymer and copolymer variations. The term copolymer includes terpolymers and polymers with at least three comonomers and unlimited number of total monomers. The typical intrinsic viscosity of these polyesters is at least 0.4 but less than 1.2 dl/g.

The compatibilizer is preferably a functionalized rubbery polymer and is typically an ethylene copolymer that functions as a compatibilizing agent or surfactant, in that it forms a covalent bond and/or physical interaction with the polyester and polyphthalamide component, and blends compatibly with the polyphthalamide component. In most cases, to get the high level of compatibility and physical properties, such as low temperature impact strength, a covalent bond will form between the polyester component and the functionalized rubbery polymer. The functionalized rubbery polymer component of the thermoplastic resin composition will normally represent from 2.0 weight percent to 25 weight percent of the polymers in the composition, with 3.0 to 10 weight percent more preferable and 4 to 8 percent most preferable. The functionalized rubbery polymer is preferably present in the composition at a level which is within the range of 3 weight percent to 15 weight percent.

The functionalized rubbery polymer will generally be a compatibilizing ethylene copolymer of the formula E/X/Y, where E is about 55-75%, X is about 15-35%, and Y is about 2-15% by weight of the compatibilizing ethylene copolymer, and E is ethylene.

X is an α,β-ethylenically unsaturated monomer derived from at least one of alkylacrylate, alkylmethacrylate, alkyl vinyl ether, carbon dioxide, sulfur dioxide, or mixtures thereof, where the alkyl groups contain 1-12 carbon atoms, such as vinyl acetate, methylacrylate, butylacrylate, and methyl vinyl ether. X can, for example, be a moiety derived from at least one of alkyl acrylate, alkyl methacrylate, alkyl vinyl ether, carbon monoxide, sulfur dioxide, or mixtures thereof. More specifically, X can, for example, contain up to about 35 weight percent of a moiety derived from at least one alkyl acrylate, alkyl methacrylate, or mixtures thereof where the alkyl groups contain 1-8 carbon atoms.

Y is an $\alpha,\beta$-ethylenically unsaturated monomer containing a reactive group, such as epoxide, maleic anhydride, isocyanate, or oxazoline, for example. In one embodiment, Y is selected from the group consisting of glycidyl methacrylate and glycidyl acrylate, maleic anhydride, and isocyanato-ethylmethacrylate.

The functionalized rubbery polymer will typically contain repeat units that are derived from an acrylate monomer of the structural formula:

wherein R represents a hydrogen atom, an alkyl group containing from 1 to about 8 carbon atoms, or a moiety containing an epoxy group, and wherein $R^1$ represents a hydrogen atom or an alkyl group containing from 1 to about 8 carbon atoms. Some representative examples of monomers that can be used include methyl methacrylate, butyl acrylate, dimethylsiloxane. In many cases, R will represent an alkyl group containing from 1 to 4 carbon atoms. The moiety containing an epoxy group will typically be of the structural formula:

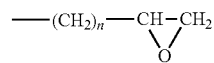

wherein n represents an integer from 1 to about 6. In most cases, n will represent 1.

The functionalized rubbery polymer will generally also contain repeat units that are derived from a conjugated diolefin monomer, such as 1,3-butadiene or isoprene, a vinyl aromatic monomer, such as styrene or $\alpha$-methyl styrene, a mono-olefin monomer, such as ethylene or propylene, and/or a dialkylsiloxane monomer, such as dimethylsiloxane.

Another compatibilizer is polypropylene with 1% maleic anhydride, available as Polybond™ 3200 from Crompton Corporation. The Royaltuf Products from Crompton Corporation are also preferred compatibilizers. These products use ethylene propylene diene monomer grafted with maleic anhydride. Of particular interest is Grade 485 with has a 75/25 Ethylene to Propylene ratio and 0.5 weight percent maleic anhydride. Grade 498 is also a good compatibilizer. Grade 498 has a 55/45 ethylene to propylene ratio and 1.0 weight percent maleic anhydride.

One special compatabilizer is polyethylene. The compatibilizer need not be a single compound, but could be a mixture of the class of compatibilizers listed herein.

The functionalized rubbery polymer can optionally contain repeat units in its backbone which are derived from an anhydride group containing monomer, such as maleic anhydride. In another scenario, the functionalized rubbery polymer can contain anhydride moieties which are grafted onto the polymer in a post polymerization step.

The composition will be comprised of a first polyamide which is a polyphthalamide which can be present in an amount within the range of about 2 weight percent to about 93 weight percent on the basis of the polyphthalamide, the second polyamide, if the second polyamide is present in the composition, the polyester and the compatibilizer. The amount of polyphthalamide can also range from about 3 to about 75 weight percent. The amount of polyphthalamide present in the composition should be at least about 2 weight percent, at least about 3 weight percent being more preferred and at least 5 weight percent being the most preferred on the basis of the polyphthalamide, the second polyamide, if the second polyamide is present in the composition, the polyester and the compatibilizer. Other ranges, include about 3 to about 50 weight percent and about 3 to about 40 weight percent. For economic reasons, the range of about 2 to about 15 weight percent will also prove useful.

The amount of the second polyamide, if present in the composition, is within the range of about 40 weight percent to about 75 weight percent on the basis of the on the basis of polyphthalamide, the second polyamide, the polyester and the compatibilizer. Other useful ranges are about 35 to about 60 weight percent and about 45 to about 70 weight percent, and about 50 to about 65 weight percent.

The amount of the aromatic polyester present in the composition is about 3 weight percent to about 30 weight percent on the basis of polyphthalamide, the second polyamide, if the second polyamide is present in the composition, the polyester and the compatibilizer. More useful amounts lie the range of 5 about weight percent to about 30 weight percent, and about 6 weight percent to about 25 weight percent.

The amount of the compatibilizer is within the range of about 12 weight percent to about 30 weight percent on the basis of the polyphthalamide, the second polyamide, if the second polyamide is present in the composition, the polyester and the compatibilizer. Other useful ranges are about 15 weight percent to 25 weight percent and about 15 to 20 weight percent.

The sum of the weight percents on the basis of the polyphthalamide, the second polyamide, if the second polyamide is present in the composition, the polyester and the compatibilizer of the polyphthalamide, the second polyamide, if the second polyamide is present in the composition, the polyester and the compatibilizer present in the composition are to equal 100 weight percent on the basis of the polyphthalamide, the second polyamide, if the second polyamide is present in the composition, the polyester and the compatibilizer.

The fillers to be optionally used in this invention provide additional strength, reduced cost, reduced shrinkage and can be characterized by aspect ratios (AR) for each different shape. The aspect ratio is length of the largest dimension divided by the smallest dimension and defines the general shape of the particle. Spherical and cubic fillers have aspect ratios ranging from 1-2 and 1-4, respectively. Examples of spherical and cubic fillers are calcium carbonate, precipitated calcium carbonate, dolomite, magnesium carbonate, calcium silicate, barium sulfate, glass beads—hollow and/or solid types, ceramic beads, natural and synthetic silica, feldspar and nepheline-syenite, aluminum trihydroxide and magnesium hydroxide, carbon black, wood flour, conductive coated particles and minerals.

Platy fillers have an aspect ratio ranging from 2-50. Examples of suitably fillers are talc, mica, kaolin, clay, and graphite. Acicular and fibrous fillers have aspect ratios ranging from 10-100 and >100, respectively. Examples of suitable acicular and fibrous fillers are Wollastonite, Whiskers, chopped glass fibers, aramid fibers, carbon fibers, long glass fibers/roving and conductive metallic fibers.

The filler is also characterized by its average particle size and specific surface which can be measured by liquid nitrogen adsorption (B.E.T method) or by permeability of air (Blaine method). The preferred average diameter is from 1 to 100 μm and the specific surface ranges between 1 m²/g to 800 m²/gm. Glass is a highly suitable filler. Glass fibers and glass spheres are examples of glass fillers.

The fillers are added in php units, where php is parts of the filler per hundred parts of the polymer which includes the polyphthalamide, the second polyamide, the aromatic polyester and compatibilizer.

As described in the examples, these compositions are made via reactive extrusion. The reactive extrusion process for preparation of the formulation will normally comprise adding a dry blend mixture of the polyphthalamide, the polyester, the modifiers and fillers and processing aids as a single feed into the feed hopper of a suitable mixing device for melt blending, such as a single or twin screw extruder or multiple mixing devices with controlled specific energy input via control of feed rate (15 to 95% torque), RPM (60 to 900 rpm), process temperature and residence time distribution. The specific energy input will typically be with the range of 0.4 to 0.8 kilowatt hours per kilogram and will more typically be within the range of 0.45 to 0.6 kilowatt hours per kilogram.

Another concern about the plastic fuel tanks is that the solvent properties of the fuel extract materials from the amides. These materials which extract from the fuel tank may be specific to the type of fuel used and are characterized as fuel extractables, or those components which will leach out or extract from the fuel tank into the fuel. This problem can be solved, or at least dramatically minimized, by subjecting the materials to an extraction process to remove the extractables prior to forming the part. Extraction before combining the materials into the part is preferable over extracting the materials from the part because of the increased surface of the pellets and separate components. This makes the extraction much more efficient.

The extraction process would use an extraction compound, likely a solvent, which would remove those fuel extractables of concern. The most likely compound would be the fuel itself, although it would not be difficult to determine the ingredient in the fuel which removes the fuel extractables. Because different types of fuels (e.g. diesel vs. gasoline) are expected to have different extractions, the fuel to be used in the final container should be a starting extraction compound. Therefore, it is expected that a good extraction liquid a component or mixture of components of gasoline or diesel. The components of gasoline are generally hydrocarbons such n-paraffins, naphthenes, olefins, and aromatics. The aromatics are mostly benzene, ethyl-benzene, toluene, and the xylenes. Other components of gasoline are ethanol, and tertiary butylmethyl ether, The extraction process could be a liquid-solid extraction process, whereby the pellets of the nylon 66 for example, would be passed through the liquid extraction compound, such as gasoline. It is well known that time of contact, temperature of contact, lack of fuel extractables (purity) of the extraction compound, and area of contact (surface area of the solid) are parameters which can be varied to increase the efficiency of the extraction.

A simple enabling process would place the pellets to be extracted into a vessel, such as beaker. Gasoline would be added to the beaker and the pellets exposed to the gasoline at room temperature for sufficient time to remove the fuel extractables to below the desired levels.

The Gasoline Extractables remaining in the pellets can be determined by finely grinding the pellets, exposing them to fresh gasoline, removing the gasoline with the fuel extractables, evaporating the gasoline and measuring the amount of material which did not evaporate. Complete and absolute removal of the fuel extractables is not expected. The practitioner can determine when a satisfactory amount of fuel extractables remain by determining how much material is left over after evaporating a known quantity of gasoline.

For example, one could take 10 grams of pellets ground to less than 20 micron and expose them to 100 grams of gasoline for 6 hours. 10 grams of gasoline would then be removed, placed in an evaporation dish and the gasoline evaporated with the fuel extractables remaining The weight of the fuel extractables per 100 grams of gasoline is easily determined by multiplying the weight by 10. That number could be divided by the amount of ground pellets, in this case, 10 grams, to determine the amount of fuel extractables per gram of pellets. The extraction could be run several times until the amount of fuel extractables removed is zero, or acceptably low for the practitioner. The amount of fuel extractables in the ground pellets would then be the summation of the fuel extractables removed from each extraction.

For instance, if the first extraction yielded 0.09 grams Fuel Extractables per gram, the second extraction yielded 0.004 grams, the third yielded 0.0001, and the fourth yielded non-detected or to low to be of concern, then the amount of Fuel Extractables in the sample would be 0.09+0.004+0.0001=0.0941 grams of Fuel Extractables per gram of pellets.

The design and application of solid-extraction processes can be found in Chemical Engineer's Handbook, Perry & Chilton, and 5th Edition at 19-41 to 19-44, which is herein incorporated by reference in its entirety.

Variations to the processes are well known in the art. For example, it is expected that efficiency per time can be increased by using a heated extraction compound. It is also well known to cause the flow of the extraction compound to be counter to the flow of the material to be extracted. Such a flow is called countercurrent flow. It is also well known to increase the efficiency by increasing the surface area of the solids. In this case, the practitioner could use any number of size reducing techniques, such as simple grinding, to reduce the particle size and increase the surface area for extraction.

It is also well known to reduce the operating costs by removing the contaminated extraction compound, purifying it and re-introducing it into the extraction vessel. In this case, the dirty gasoline would be removed from the vessel, evaporated, leaving the fuel extractables, condensed, then reintroduced into extraction vessel. As described, in the Handbook, this could be easily adapted for a continuous process. One skilled in the art can easily determine that a heated process is preferred at the operating temperature just below the boiling point of the extraction compound.

After being extracted, the pellets could be optionally exposed to either heat or a driving force of vacuum or inert gas, or both to remove residual extraction compound. If the pellets had been finely ground, it may be preferable to re-form them into large pellets for easier use downstream. If the pellets have not been ground, then they may used to form further products at any point along the stream.

The process for reducing the amount of fuel extractables in a material used to manufacture a plastic container for organic liquids would comprises the steps of selecting at least one material used to manufacture the container and extracting at least some of the fuel extractables from the material.

The process would specifically be an extraction process known as a liquid-solid extraction wherein the compound used to the manufacture the container is in its solid form and wherein the liquid is comprised of an organic compound. The liquid would be comprised of gasoline or diesel fuel and/or a component of gasoline or diesel fuel.

A major use of the above composition is in plastic fuel tanks A fuel tank will have at least one wall and at least two openings. The first opening receives the fuel and is capable of receiving a cap. Often the cap is vented. If the cap is not vented, then the fuel tank may have additional openings for venting. Venting is necessary to prevent a vacuum from forming and interfering with fuel flow out of the tank through the second opening.

These compositions and extraction process will find use in making storage vessels for organic compounds which are commonly known as fuel tanks These fuel tanks, or containers for organic liquids, usually have at least connection to an energy conversion device, such as a diesel, two or four cycle, or rotary engine, which consumes the fuel stored in the container. The connection to the propulsion mechanism is done in such a manner so that the organic liquid may be withdrawn from the container and submitted to the energy conversion device where the fuel is converted to some form of mechanical energy. This can be succinctly described as a container for organic liquids connected with an energy conversion device in such a manner that the organic liquid stored in the container is capable of being transferred from the container to the energy conversion mechanism.

This concept can be understood by examining the figures of this specification. In FIG. 1, 1A is the cap covering the inlet where the fuel, or liquid organic, is introduced into the tank. 1B is seam where the bottom half is welded or otherwise sealed to the top half If the container is not welded, it may be injection molded or blown into the mold and the seam 1B would be where the two halves of the mold come together. 1C is the top of the volumetric portion where the fuel, or organic liquid, is actually stored. 1D is the mounting device which attaches the container to the engine (the energy conversion device). In this case, the round circular mount encompasses the air cooler of the energy conversion device. The air cooler is usually attached to crankshaft of the engine. This is not the type of connection which allows the transport of the fuel from the container.

Figure 2:
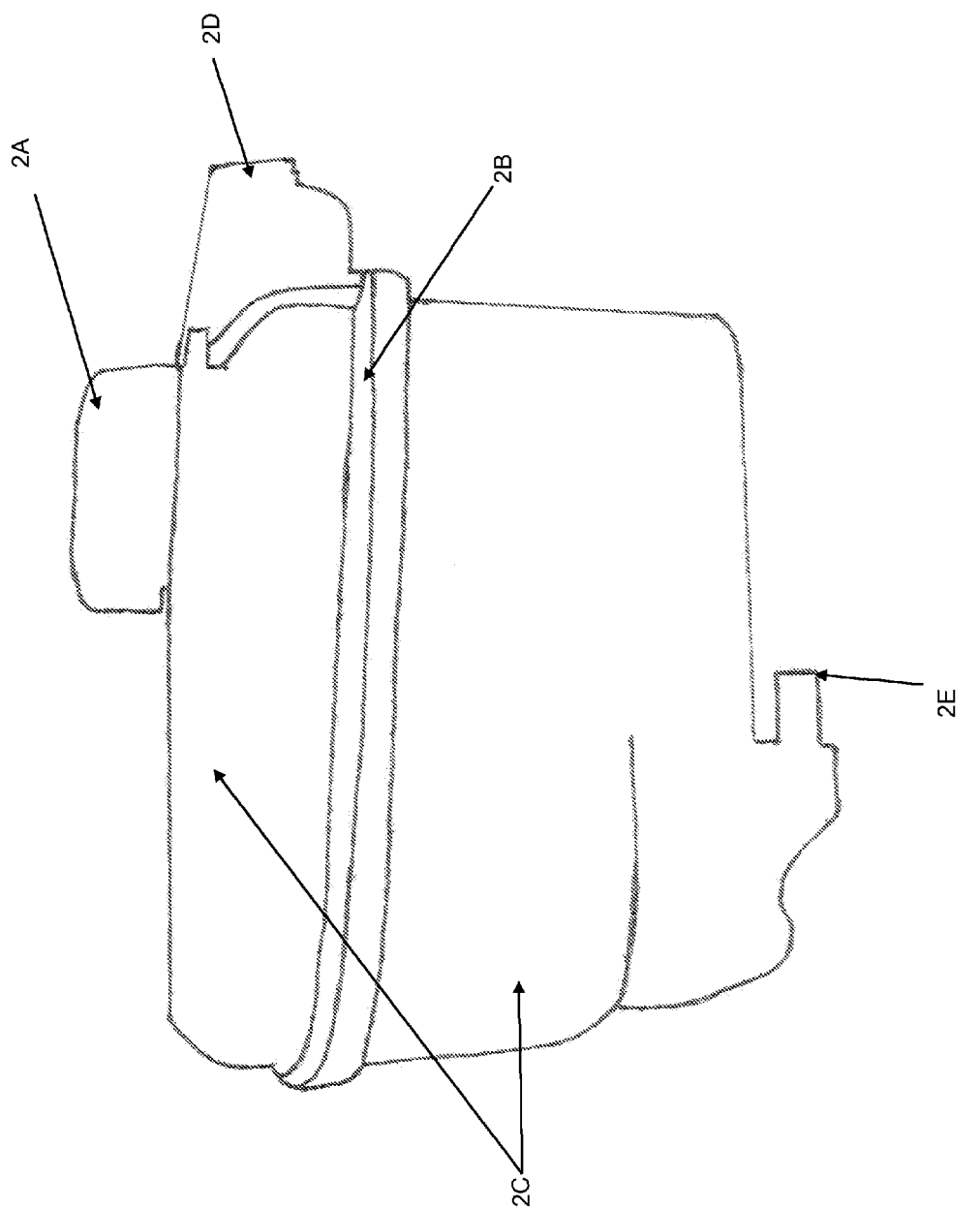
FIG. 2 depicts the representative fuel tank as viewed from the side.

In FIG. 2, 2A is the fuel tank cap covering the inlet where the fuel is introduced into the tank. 2B is the welded or otherwise sealed seam joining the top and bottom halves. If the container is not welded, it may be injection molded or blown into the mold and the seam 2B would be where the two halves of the mold come together. 2C is volumetric storage where the fuel is actually contained. 2D is the mounting device sticking out and behind the tank as seen from the side view. 2E is the fuel outlet where the fuel is withdrawn from the tank. It is at this outlet that a tube would be used to connect this outlet with an inlet to the energy conversion device. This tube is an example of the manner of connection that is capable of transporting the fuel from the container to energy conversion device. It should be noted, the some fuel tanks will have the inlet and outlet in the cap.

Figure 3:
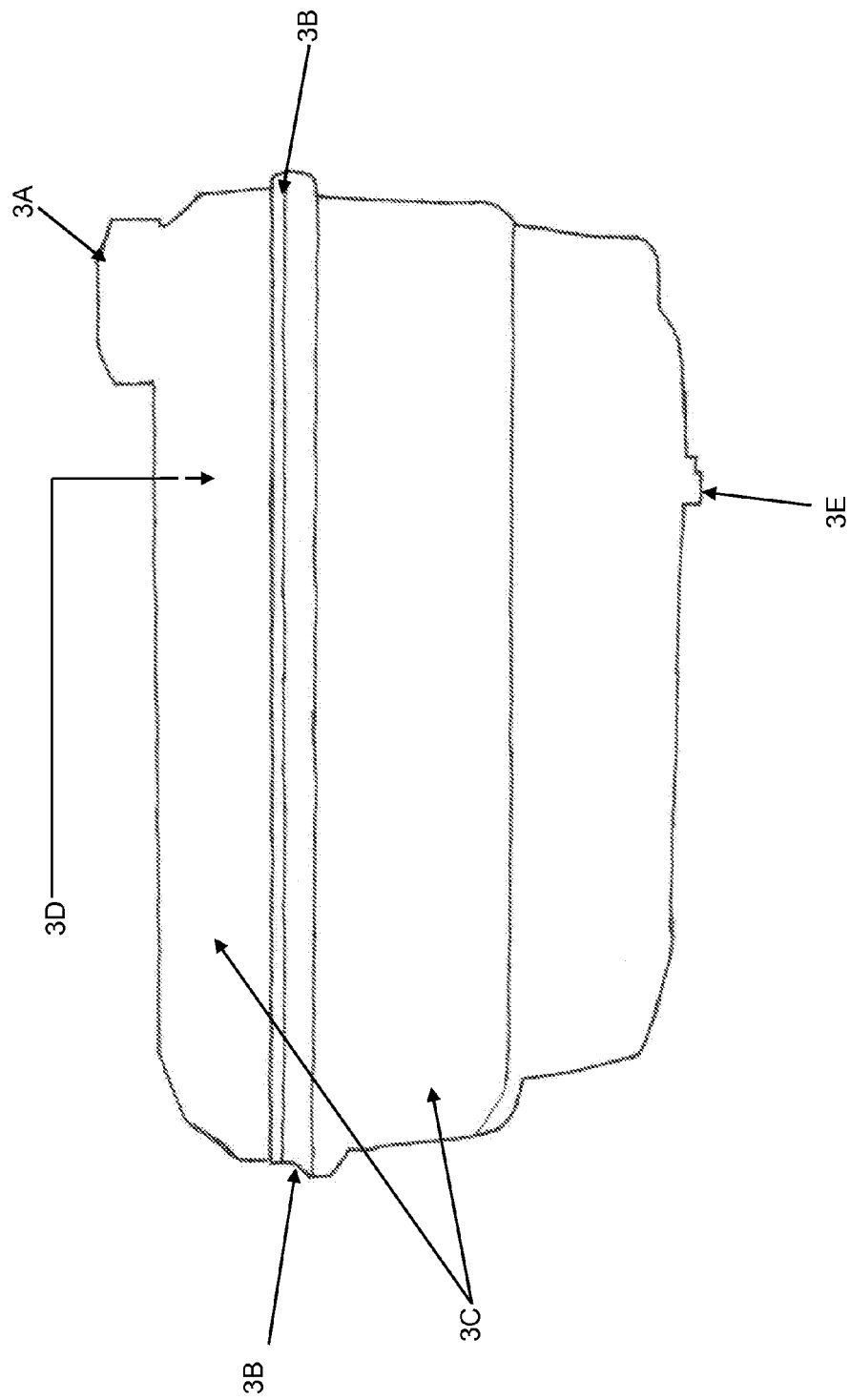
FIG. 3 depicts the representative fuel tank as viewed from the front.

In FIG. 3, 3A depicts the fuel cap. 3B depicts the seam or joiner where the two molded halves have been joined. If the container is not welded, it may be injection molded or blown into the mold and the seam 3B would be where the two halves of the mold come together. 3C is the volumetric fuel storage. 3D is the mounting assembly. In the front view, the mounting assembly is completely hidden and lies behind the tank itself 3E is the fuel outlet and would be connected to the energy conversion device in a similar manner as 2E.

Figure 4:
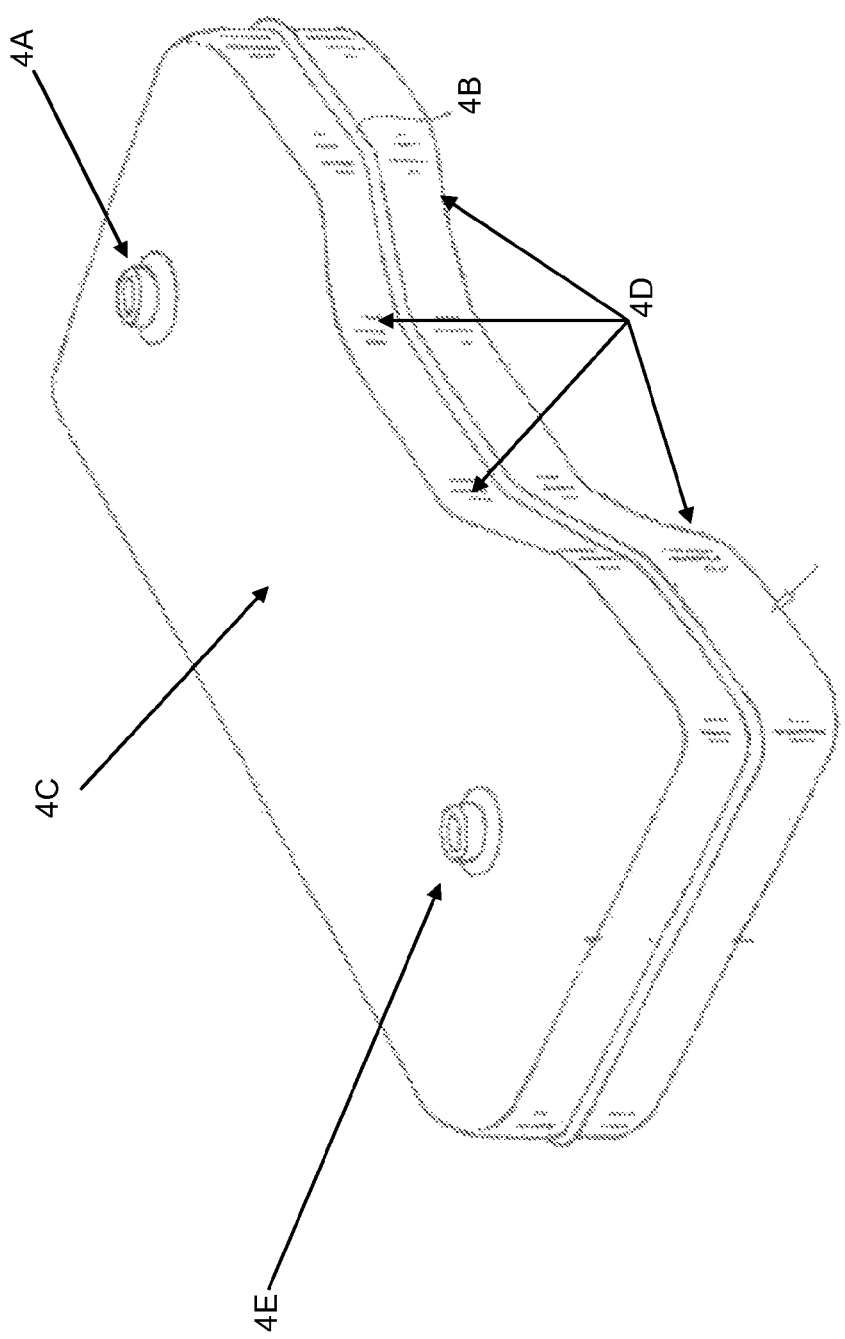
FIG. 4 depicts a different representative fuel tank design.

In FIG. 4, 4A is the fuel inlet. 4B is the seam where the two halves are joined and welded or otherwise sealed together. If the container is not welded, it may be injection molded or blown into the mold and the seam 4B would be where the two halves of the mold come together. 4C is the volumetric portion of fuel tank where the fuel is stored. 4D is the mounting assembly. In this case the tank is molded to fit against a part. 4E is the fuel outlet.

Rather than flowing with gravity, the fuel would be withdrawn using vacuum or a pump placed inside the tank, like many automotive tanks are today. The pump may also be located outside the tank as well.

Plastic fuel tanks can be made of different wall types. A multilayer wall combines different layers, each layer imparting different properties. In the multilayer wall, not all the layers may be plastic. For example, the outer plastic may be coated with a layer of metal. A multilayer wall may be made by co-extruding the various layers or pre-extruding the layers and making the structure by laying one layer against the other. While the above composition could be a layer of a multilayer wall, it is more preferable to place it in a monolayer wall. A monolayer wall contains only one layer with the constituents dispersed throughout the wall.

As a monolayer wall, the fuel tank can be manufactured using different techniques. The tank with a monolayer wall could be manufactured by injection molding the composition into a part with very tight tolerances. The injection molding process is typical in the industry and requires heating the composition to above its melting point in an extruder and introducing the liquid composition into the mold and letting it cool. In many cases the composition is injection molded into two halves and then assembled by welding or other means of attaching the two halves together. Because the composition can be blow molded, the tank may be made by extrusion blow or other blow molding techniques.

If the manufacturing process makes two halves of the tank, the halves may also be manufacturing by thermoforming or plug assist molding. In thermoforming, the composition is cast into a sheet and the sheet formed into the mold half and the finished part is then cut from the sheet leaving a web. After removal from the web, the two halves can be joined.

Rotational molding is another manufacturing process which eliminates the need of welding or joining two halves. The rotational manufacturing process benefits greatly from the composition in the monolayer construction.

The following examples demonstrate the superiority of these compositions.

EXAMPLE 1

The main feeder of a ZE 25 twin screw extruder (L/D=44) operated at a rate of 600 r.p.m. and a set temperature profile of 25° C. (feed), 250° C. (Zone 2), 275° C. (Zone 3), 280° C. (Zone 4), 285° C. (Zone 5), 285° C. (Zone 6), 275° C. (Zone 7), 270° C. (Zone 8), 270° C. (Zone 9), 270° C. (Zone 10), 265° C. (Zone 11), 265° C. (die), was charged with 92.65 parts of nylon 6,6 Poly(hexamethylene adipamide), 7 parts of Royaltuf® 485 maleic anhydride grafted EPDM from Crompton Corporation, 0.20 parts of ELC-1010 tetrakis methylene(3,5-di-t-butyl-4-hydroxyhydrocinnamate)methane from Ed-Lynn Network Polymers, and 0.15 parts of ELC-626 (also available as Ultranox®® 626 from Ciba Giegy) is bis(2,4-di-t-butylphenyl)pentaerythritol diphosphite stabilizer from Ed-Lynn Network Polymers. The product was pelletized and dried at 80° C. for 4 hours to a moisture content of less than 0.05% by weight. Then, test specimens were made by injection molding and were allowed to condition at a temperature of 23° C. for at least 48 hours before testing.

The properties of the resulting compound are summarized in Table 1.

TABLE 1

| Properties | Test Method | Units | Example 1 |
|---|---|---|---|
| Tensile Modulus | ASTM D638 | MPa. | 1687 |
| Tensile Strength @ Yield | ASTM D 638 | MPa. | 60.9 |
| Tensile Strength @ Break | ASTM D638 | MPa. | 52.3 |
| Strain @ Break | ASTM D638 | % | 21.3 |
| Flexural Modulus | ASTM D790 | MPa. | |
| Flexural Stress | ASTM D790 | MPa. | |
| Notched Izod @ 23° C. | ASTM D256 | ft · lb/in | 3.14 |
| HDT @ 66 psi. | ASTM D648 | ° C. | 221 |
| @ 264 psi. | | ° C. | |

EXAMPLE 2

The main feeder of a ZE 25 twin screw extruder (L/D=44) operated at a rate of 600 r.p.m. and a set temperature profile of 25° C. (feed), 250° C. (Zone 2), 275° C. (Zone 3), 280° C. (Zone 4), 285° C. (Zone 5), 285° C. (Zone 6), 275° C. (Zone 7), 270° C. (Zone 8), 270° C. (Zone 9), 270° C. (Zone 10), 265° C. (Zone 11), 265° C. (die), was charged with 92.65 parts of nylon 6,6 Poly(hexamethylene adipamide), 7 parts of Royaltuf® 498 maleic anhydride grafted EPDM from Crompton Corporation, 0.20 parts of ELC-1010 tetrakis methylene(3,5-di-t-butyl-4-hydroxyhydrocinnamate)methane from Ed-Lynn Network Polymers, and 0.15 parts of ELC-626 (also available as Ultranox® 626 from Ciba Giegy) is bis(2,4-di-t-butylphenyl)pentaerythritol diphosphite stabilizer from Ed-Lynn Network Polymers. The product was pelletized and dried at 80° C. for 4 hours to a moisture content of less than 0.05% by weight. Then, test specimens were made by injection molding and were allowed to condition at a temperature of 23° C. for at least 48 hours before testing.

The properties of the resulting compound are summarized in Table 2.

TABLE 2

| Properties | Test Method | Units | Example 2 |
|---|---|---|---|
| Tensile Modulus | ASTM D638 | MPa. | 1810 |
| Tensile Strength @ Yield | ASTM D 638 | MPa. | 64.5 |
| Tensile Strength @ Break | ASTM D638 | MPa. | 53.5 |
| Strain @ Break | ASTM D638 | % | 19.0 |
| Flexural Modulus | ASTM D790 | MPa. | |
| Flexural Stress | ASTM D790 | MPa. | |
| Notched Izod @ 23° C. | ASTM D256 | ft · lb/in | 2.75 |
| HDT @ 66 psi. | ASTM D648 | ° C. | 233 |
| @ 264 psi. | | ° C. | |

EXAMPLE 3

The main feeder of a ZE 25 twin screw extruder (L/D=44) operated at a rate of 600 r.p.m. and a set temperature profile of 25° C. (feed), 250° C. (Zone 2), 275° C. (Zone 3), 280° C. (Zone 4), 285° C. (Zone 5), 285° C. (Zone 6), 275° C. (Zone 7), 270° C. (Zone 8), 270° C. (Zone 9), 270° C. (Zone 10), 265° C. (Zone 11), 265° C. (die), was charged with 84.66 parts of nylon 6,6 Poly(hexamethylene adipamide), 14.94 parts of Royaltuf® 485 maleic anhydride grafted EPDM from Crompton Corporation, 0.20 parts of ELC-1010 tetrakis methylene(3,5-di-t-butyl-4-hydroxyhydrocinnamate)methane from Ed-Lynn Network Polymers, and 0.15 parts of ELC-626 (also available as Ultranox® 626 from Ciba Giegy) is bis(2,4-di-t-butylphenyl)pentaerythritol diphosphite stabilizer from Ed-Lynn Network Polymers. The product was pelletized and dried at 80° C. for 4 hours to a moisture content of less than 0.05% by weight. Then, test specimens were made by injection molding and were allowed to condition at a temperature of 23° C. for at least 48 hours before testing.

The properties of the resulting compound are summarized in Table 3.

TABLE 3

| Properties | Test Method | Units | Example 3 |
|---|---|---|---|
| Tensile Modulus | ASTM D638 | MPa. | 1553.8 |
| Tensile Strength @ Yield | ASTM D 638 | MPa. | 49.6 |
| Tensile Strength @ Break | ASTM D638 | MPa. | 42.5 |
| Strain @ Break | ASTM D638 | % | 27.6 |
| Flexural Modulus | ASTM D790 | MPa. | |
| Flexural Stress | ASTM D790 | MPa. | |
| Notched Izod @ 23° C. | ASTM D256 | ft · lb/in | |
| HDT @ 66 psi. | ASTM D648 | ° C. | |
| @ 264 psi. | | ° C. | |

EXAMPLE 4

The main feeder of a ZE 25 twin screw extruder (L/D=44) operated at a rate of 600 r.p.m. and a set temperature profile of 25° C. (feed), 250° C. (Zone 2), 275° C. (Zone 3), 280° C. (Zone 4), 285° C. (Zone 5), 285° C. (Zone 6), 275° C. (Zone 7), 270° C. (Zone 8), 270° C. (Zone 9), 270° C. (Zone 10), 265° C. (Zone 11), 265° C. (die), was charged with 79.68 parts of nylon 6,6 Poly(hexamethylene adipamide), 19.92 parts of Royaltuf® 485 maleic anhydride grafted EPDM from Crompton Corporation, 0.20 parts of ELC-1010 tetrakis methylene(3,5-di-t-butyl-4-hydroxyhydrocinnamate)methane from Ed-Lynn Network Polymers, and 0.15 parts of ELC-626 (also available as Ultranox® 626 from Ciba Giegy) is bis(2,4-di-t-butylphenyl)pentaerythritol diphosphite stabilizer from Ed-Lynn Network Polymers. The product was pelletized and dried at 80° C. for 4 hours to a moisture content of less than 0.05% by weight. Then, test specimens were made by injection molding and were allowed to condition at a temperature of 23° C. for at least 48 hours before testing.

The properties of the resulting compound are summarized in Table 4.

TABLE 4

| Properties | Test Method | Units | Example 4 |
|---|---|---|---|
| Tensile Modulus | ASTM D638 | MPa. | 1600 |
| Tensile Strength @ Yield | ASTM D 638 | MPa. | 47 |
| Tensile Strength @ Break | ASTM D638 | MPa. | 42.3 |
| Strain @ Break | ASTM D638 | % | 31 |
| Flexural Modulus | ASTM D790 | MPa. | 6.1 |
| Flexural Stress | ASTM D790 | MPa. | 24.2 |
| Notched Izod @ 23° C. | ASTM D256 | ft · lb/in | 16.2 |
| HDT @ 66 psi. | ASTM D648 | ° C. | 199 |
| @ 264 psi. | | ° C. | 57 |

EXAMPLE 5

The main feeder of a ZE 25 twin screw extruder (L/D=44) operated at a rate of 600 r.p.m. and a set temperature profile of 25° C. (feed), 250° C. (Zone 2), 275° C. (Zone 3), 280° C. (Zone 4), 285° C. (Zone 5), 285° C. (Zone 6), 275° C. (Zone 7), 270° C. (Zone 8), 270° C. (Zone 9), 270° C. (Zone 10), 265° C. (Zone 11), 265° C. (die), was charged with 74.84 parts of nylon 6,6 Poly(hexamethylene adipamide), 18.71 parts of Corterra® 200 Poly(trimethylene terephthalate), 3 parts of Royaltuf® 498 maleic anhydride grafted EPDM from Crompton Corporation, 3 parts of Lotader® 8900 terpolymer of ethylene, methyl methacrylate and glycidyl methacrylate, 0.20 parts of ELC-1010 tetrakis methylene(3,5-di-t-butyl-4-hydroxyhydrocinnamate)methane from Ed-Lynn Network Polymers, and 0.15 parts of ELC-626 (also available as Ultranox® 626 from Ciba Giegy) is bis(2,4-di-t-butylphenyl)pentaerythritol diphosphite stabilizer from Ed-Lynn Network Polymers. The product was pelletized and dried at 80° C. for 4 hours to a moisture content of less than 0.05% by weight. Then, test specimens were made by injection molding and were allowed to condition at a temperature of 23° C. for at least 48 hours before testing.

The properties of the resulting compound are summarized in Table 5.

TABLE 5

| Properties | Test Method | Units | Example 5 |
|---|---|---|---|
| Tensile Modulus | ASTM D638 | MPa. | 2096 |
| Tensile Strength @ Yield | ASTM D 638 | MPa. | 61.1 |
| Tensile Strength @ Break | ASTM D638 | MPa. | 56.3 |
| Strain @ Break | ASTM D638 | % | 8.1 |
| Flexural Modulus | ASTM D790 | MPa. | 2468 |
| Flexural Stress | ASTM D790 | MPa. | 92.5 |
| Notched Izod @ 23° C. | ASTM D256 | ft · lb/in | 1.53 |
| HDT @ 66 psi. | ASTM D648 | ° C. | 208 |
| @ 264 psi. | | ° C. | 66.3 |

EXAMPLE 6

The main feeder of a ZE 25 twin screw extruder (L/D=44) operated at a rate of 600 r.p.m. and a set temperature profile of 25° C. (feed), 250° C. (Zone 2), 275° C. (Zone 3), 280° C. (Zone 4), 285° C. (Zone 5), 285° C. (Zone 6), 275° C. (Zone 7), 270° C. (Zone 8), 270° C. (Zone 9), 270° C. (Zone 10), 265° C. (Zone 11), 265° C. (die), was charged with 56.13 parts of nylon 6,6 Poly(hexamethylene adipamide), 37.42 parts of Corterra® 200 Poly(trimethylene terephthalate), 3 parts of Royaltuf® 498 maleic anhydride grafted EPDM from Crompton Corporation, 3 parts of Lotader® 8900 terpolymer of ethylene, methyl methacrylate and glycidyl methacrylate, 0.20 parts of ELC-1010 tetrakis methylene(3,5-di-t-butyl-4-hydroxyhydrocinnamate)methane from Ed-Lynn Network Polymers, and 0.15 parts of ELC-626 (also available as Ultranox® 626 from Ciba Giegy) is bis(2,4-di-t-butylphenyl)pentaerythritol diphosphite stabilizer from Ed-Lynn Network Polymers. The product was pelletized and dried at 80° C. for 4 hours to a moisture content of less than 0.05% by weight. Then, test specimens were made by injection molding and were allowed to condition at a temperature of 23° C. for at least 48 hours before testing.

The properties of the resulting compound are summarized in Table 6.

TABLE 6

| Properties | Test Method | Units | Example 6 |
|---|---|---|---|
| Tensile Modulus | ASTM D638 | MPa. | 2068 |
| Tensile Strength @ Yield | ASTM D 638 | MPa. | 61.2 |
| Tensile Strength @ Break | ASTM D638 | MPa. | 59.2 |
| Strain @ Break | ASTM D638 | % | 8.0 |
| Flexural Modulus | ASTM D790 | MPa. | 2418 |
| Flexural Stress | ASTM D790 | MPa. | 89.5 |
| Notched Izod @ 23° C. | ASTM D256 | ft · lb/in | 1.53 |
| HDT @ 66 psi. | ASTM D648 | ° C. | 199 |
| @ 264 psi. | | ° C. | 59.8 |

EXAMPLE 7

The main feeder of a ZE 25 twin screw extruder (L/D=44) operated at a rate of 600 r.p.m. and a set temperature profile of 25° C. (feed), 250° C. (Zone 2), 275° C. (Zone 3), 280° C. (Zone 4), 285° C. (Zone 5), 285° C. (Zone 6), 275° C. (Zone 7), 270° C. (Zone 8), 270° C. (Zone 9), 270° C. (Zone 10), 265° C. (Zone 11), 265° C. (die), was charged with 37.42 parts of nylon 6,6 Poly(hexamethylene adipamide), 56.13 parts of Corterra® 200 Poly(trimethylene terephthalate), 3 parts of Royaltuf® 498 maleic anhydride grafted EPDM from Crompton Corporation, 3 parts of Lotader® 8900 terpolymer of ethylene, methyl methacrylate and glycidyl methacrylate, 0.20 parts of ELC-1010 tetrakis methylene(3,5-di-t-butyl-4-hydroxyhydrocinnamate)methane from Ed-Lynn Network Polymers, and 0.15 parts of ELC-626 (also available as Ultranox® 626 from Ciba Giegy) is bis(2,4-di-t-butylphenyl)pentaerythritol diphosphite stabilizer from Ed-Lynn Network Polymers. The product was pelletized and dried at 80° C. for 4 hours to a moisture content of less than 0.05% by weight. Then, test specimens were made by injection molding and were allowed to condition at a temperature of 23° C. for at least 48 hours before testing.

The properties of the resulting compound are summarized in Table 7.

TABLE 7

| Properties | Test Method | Units | Example 7 |
|---|---|---|---|
| Tensile Modulus | ASTM D638 | MPa. | 1999 |
| Tensile Strength @ Yield | ASTM D 638 | MPa. | 50.3 |
| Tensile Strength @ Break | ASTM D638 | MPa. | 50.3 |
| Strain @ Break | ASTM D638 | % | 3.2 |
| Flexural Modulus | ASTM D790 | MPa. | 2450 |
| Flexural Stress | ASTM D790 | MPa. | 78.5 |
| Notched Izod @ 23° C. | ASTM D256 | ft · lb/in | 0.35 |
| HDT @ 66 psi. | ASTM D648 | ° C. | 186 |
| @ 264 psi. | | ° C. | 58.9 |

EXAMPLE 8

The main feeder of a ZE 25 twin screw extruder (L/D=44) operated at a rate of 600 r.p.m. and a set temperature profile of 25° C. (feed), 250° C. (Zone 2), 275° C. (Zone 3), 280° C. (Zone 4), 285° C. (Zone 5), 285° C. (Zone 6), 275° C. (Zone 7), 270° C. (Zone 8), 270° C. (Zone 9), 270° C. (Zone 10), 265° C. (Zone 11), 265° C. (die), was charged with 18.71 parts of nylon 6,6 Poly(hexamethylene adipamide), 74.84 parts of Corterra® 200 Poly(trimethylene terephthalate), 3 parts of Royaltuf® 498 maleic anhydride grafted EPDM from Crompton Corporation, 3 parts of Lotader® 8900 terpolymer of ethylene, methyl methacrylate and glycidyl methacrylate, 0.20 parts of ELC-1010 tetrakis methylene(3,5-di-t-butyl-4-hydroxyhydrocinnamate)methane from Ed-Lynn Network Polymers, and 0.15 parts of ELC-626 (also available as Ultranox® 626 from Ciba Giegy) is bis(2,4-di-t-butylphenyl)pentaerythritol diphosphite stabilizer from Ed-Lynn Network Polymers. The product was pelletized and dried at 80° C. for 4 hours to a moisture content of less than 0.05% by weight. Then, test specimens were made by injection molding and were allowed to condition at a temperature of 23° C. for at least 48 hours before testing.

The properties of the resulting compound are summarized in Table 8.

TABLE 8

| Properties | Test Method | Units | Example 8 |
|---|---|---|---|
| Tensile Modulus | ASTM D638 | MPa. | 1919 |
| Tensile Strength @ Yield | ASTM D 638 | MPa. | 52.9 |

TABLE 8-continued

| Properties | Test Method | Units | Example 8 |
|---|---|---|---|
| Tensile Strength @ Break | ASTM D638 | MPa. | 52.8 |
| Strain @ Break | ASTM D638 | % | 3.9 |
| Flexural Modulus | ASTM D790 | MPa. | 2390 |
| Flexural Stress | ASTM D790 | MPa. | 75.4 |
| Notched Izod @ 23° C. | ASTM D256 | ft · lb/in | 0.6 |
| HDT @ 66 psi. | ASTM D648 | ° C. | |
| @ 264 psi. | | ° C. | 57.6 |

EXAMPLE 9

The main feeder of a ZE 25 twin screw extruder (L/D=44) operated at a rate of 600 r.p.m. and a set temperature profile of 25° C. (feed), 250° C. (Zone 2), 275° C. (Zone 3), 280° C. (Zone 4), 285° C. (Zone 5), 285° C. (Zone 6), 275° C. (Zone 7), 270° C. (Zone 8), 270° C. (Zone 9), 270° C. (Zone 10), 265° C. (Zone 11), 265° C. (die), was charged with 49.10 parts of nylon 6,6 Poly(hexamethylene adipamide), 16 parts of Corterra® 200 Poly(trimethylene terephthalate), 25 parts of Royaltuf® 485 maleic anhydride grafted EPDM from Crompton Corporation, 3 parts of Lotader® 4700, 5 parts of Lotader® 8900 terpolymer of ethylene, methyl methacrylate and glycidyl methacrylate, 1.5 parts of Phenoxy PKFE, 0.20 parts of ELC-1010 tetrakis methylene(3,5-di-t-butyl-4-hydroxyhydrocinnamate)methane from Ed-Lynn Network Polymers, and 0.15 parts of ELC-626 (also available as Ultranox® 626 from Ciba Giegy) is bis(2,4-di-t-butylphenyl)pentaerythritol diphosphite stabilizer from Ed-Lynn Network Polymers. The product was pelletized and dried at 80° C. for 4 hours to a moisture content of less than 0.05% by weight. Then, test specimens were made by injection molding and were allowed to condition at a temperature of 23° C. for at least 48 hours before testing.

The properties of the resulting compound are summarized in Table 9.

TABLE 9

| Properties | Test Method | Units | Example 9 |
|---|---|---|---|
| Tensile Modulus | ASTM D638 | MPa. | 851.4 |
| Tensile Strength @ Yield | ASTM D 638 | MPa. | 29.6 |
| Tensile Strength @ Break | ASTM D638 | MPa. | 28.1 |
| Strain @ Break | ASTM D638 | % | 64.6 |
| Flexural Modulus | ASTM D790 | MPa. | 971.2 |
| Flexural Stress | ASTM D790 | MPa. | 38.1 |
| Notched Izod @ 23° C. | ASTM D256 | ft · lb/in | 17.8 |
| HDT @ 66 psi. | ASTM D648 | ° C. | |
| @ 264 psi. | | ° C. | 53.1 |

EXAMPLE 10

The main feeder of a ZE 25 twin screw extruder (L/D=44) operated at a rate of 600 r.p.m. and a set temperature profile of 25° C. (feed), 250° C. (Zone 2), 275° C. (Zone 3), 280° C. (Zone 4), 285° C. (Zone 5), 285° C. (Zone 6), 275° C. (Zone 7), 270° C. (Zone 8), 270° C. (Zone 9), 270° C. (Zone 10), 265° C. (Zone 11), 265° C. (die), was charged with 50.1 parts of nylon 6,6 Poly(hexamethylene adipamide), 11 parts of Corterra® 200 Poly(trimethylene terephthalate), 29 parts of Royaltuf® 485 maleic anhydride grafted EPDM from Crompton Corporation, 3 parts of Lotader® 4700, 5 parts of Lotader® 8900 terpolymer of ethylene, methyl methacrylate and glycidyl methacrylate, 1.5 parts of Phenoxy PKFE, 0.20 parts of ELC-1010 tetrakis methylene(3,5-di-t-butyl-4-hydroxyhydrocinnamate)methane from Ed-Lynn Network Polymers, and 0.15 parts of ELC-626 (also available as Ultranox® 626 from Ciba Giegy) is bis(2,4-di-t-butylphenyl)pentaerythritol diphosphite stabilizer from Ed-Lynn Network Polymers. The product was pelletized and dried at 80° C. for 4 hours to a moisture content of less than 0.05% by weight. Then, test specimens were made by injection molding and were allowed to condition at a temperature of 23° C. for at least 48 hours before testing.

The properties of the resulting compound are summarized in Table 10.

TABLE 10

| Properties | Test Method | Units | Example 10 |
|---|---|---|---|
| Tensile Modulus | ASTM D638 | MPa. | 761 |
| Tensile Strength @ Yield | ASTM D 638 | MPa. | 30.1 |
| Tensile Strength @ Break | ASTM D638 | MPa. | 30 |
| Strain @ Break | ASTM D638 | % | 118.3 |
| Flexural Modulus | ASTM D790 | MPa. | 837.4 |
| Flexural Stress | ASTM D790 | MPa. | 34.2 |
| Notched Izod @ 23° C. | ASTM D256 | ft · lb/in | 17.4 |
| HDT @ 66 psi. | ASTM D648 | ° C. | |
| @ 264 psi. | | ° C. | 51.3 |

EXAMPLE 11

The main feeder of a ZE 25 twin screw extruder (L/D=44) operated at a rate of 600 r.p.m. and a set temperature profile of 25° C. (feed), 250° C. (Zone 2), 275° C. (Zone 3), 280° C. (Zone 4), 285° C. (Zone 5), 285° C. (Zone 6), 275° C. (Zone 7), 270° C. (Zone 8), 270° C. (Zone 9), 270° C. (Zone 10), 265° C. (Zone 11), 265° C. (die), was charged with 47.10 parts of nylon 6,6 Poly(hexamethylene adipamide), 16 parts of Corterra® 200 Poly(trimethylene terephthalate), 22 parts of Royaltuf® 485 maleic anhydride grafted EPDM from Crompton Corporation, 3 parts of Lotader® 4700, 10 parts of Lotader® 8900 terpolymer of ethylene, methyl methacrylate and glycidyl methacrylate, 1.5 parts of Phenoxy PKFE, 0.20 parts of ELC-1010 tetrakis methylene(3,5-di-t-butyl-4-hydroxyhydrocinnamate)methane from Ed-Lynn Network Polymers, and 0.15 parts of ELC-626 (also available as Ultranox® 626 from Ciba Giegy) is bis(2,4-di-t-butylphenyl)pentaerythritol diphosphite stabilizer from Ed-Lynn Network Polymers. The product was pelletized and dried at 80° C. for 4 hours to a moisture content of less than 0.05% by weight. Then, test specimens were made by injection molding and were allowed to condition at a temperature of 23° C. for at least 48 hours before testing.

The properties of the resulting compound are summarized in Table 11.

TABLE 11

| Properties | Test Method | Units | Example 11 |
|---|---|---|---|
| Tensile Modulus | ASTM D638 | MPa. | 768.6 |
| Tensile Strength @ Yield | ASTM D 638 | MPa. | 31 |
| Tensile Strength @ Break | ASTM D638 | MPa. | 30.9 |
| Strain @ Break | ASTM D638 | % | 106.5 |
| Flexural Modulus | ASTM D790 | MPa. | 898.5 |
| Flexural Stress | ASTM D790 | MPa. | 35.5 |
| Notched Izod @ 23° C. | ASTM D256 | ft · lb/in | 18.6 |
| HDT @ 66 psi. | ASTM D648 | ° C. | |
| @ 264 psi. | | ° C. | 55.2 |

EXAMPLE 12

The main feeder of a ZE 25 twin screw extruder (L/D=44) operated at a rate of 600 r.p.m. and a set temperature profile of 25° C. (feed), 250° C. (Zone 2), 275° C. (Zone 3), 280° C. (Zone 4), 285° C. (Zone 5), 285° C. (Zone 6), 275° C. (Zone 7), 270° C. (Zone 8), 270° C. (Zone 9), 270° C. (Zone 10), 265° C. (Zone 11), 265° C. (die), was charged with 50.60 parts of nylon 6,6 Poly(hexamethylene adipamide), 16 parts of Corterra® 200 Poly(trimethylene terephthalate), 25 parts of Royaltuf® 485 maleic anhydride grafted EPDM from Crompton Corporation, 3 parts of Lotader® 4700, 5 parts of Lotader® 8900 terpolymer of ethylene, methyl methacrylate and glycidyl methacrylate, 0.20 parts of ELC-1010 tetrakis methylene(3,5-di-t-butyl-4-hydroxyhydrocinnamate)methane from Ed-Lynn Network Polymers, and 0.15 parts of ELC-626 (also available as Ultranox® 626 from Ciba Giegy) is bis(2,4-di-t-butylphenyl)pentaerythritol diphosphite stabilizer from Ed-Lynn Network Polymers. The product was pelletized and dried at 80° C. for 4 hours to a moisture content of less than 0.05% by weight. Then, test specimens were made by injection molding and were allowed to condition at a temperature of 23° C. for at least 48 hours before testing.

The properties of the resulting compound are summarized in Table 12.

TABLE 12

| Properties | Test Method | Units | Example 12 |
|---|---|---|---|
| Tensile Modulus | ASTM D638 | MPa. | 855.3 |
| Tensile Strength @ Yield | ASTM D 638 | MPa. | 30.4 |
| Tensile Strength @ Break | ASTM D638 | MPa. | 30.4 |
| Strain @ Break | ASTM D638 | % | 89.3 |
| Flexural Modulus | ASTM D790 | MPa. | 960.1 |
| Flexural Stress | ASTM D790 | MPa. | 38.4 |
| Notched Izod @ 23° C. | ASTM D256 | ft · lb/in | 17.6 |
| HDT @ 66 psi. | ASTM D648 | ° C. | |
| @ 264 psi. | | ° C. | 52.2 |

EXAMPLE 13

The main feeder of a ZE 25 twin screw extruder (L/D=44) operated at a rate of 600 r.p.m. and a set temperature profile of 25° C. (feed), 250° C. (Zone 2), 275° C. (Zone 3), 295° C. (Zone 4), 300° C. (Zone 5), 295° C. (Zone 6), 280° C. (Zone 7), 270° C. (Zone 8), 270° C. (Zone 9), 270° C. (Zone 10), 265° C. (Zone 11), 265° C. (die), was charged with 79.68 parts of nylon 6,6 Poly(hexamethylene adipamide), 19.92 parts of Amodel® AT 1002 Polyphthalamide, 0.20 parts of ELC-1010 tetrakis methylene(3,5-di-t-butyl-4-hydroxyhydrocinnamate)methane from Ed-Lynn Network Polymers, and 0.15 parts of ELC-626 (also available as Ultranox® 626 from Ciba Giegy) is bis(2,4-di-t-butylphenyl)pentaerythritol diphosphite stabilizer from Ed-Lynn Network Polymers. The product was pelletized and dried at 80° C. for 4 hours to a moisture content of less than 0.05% by weight. Then, test specimens were made by injection molding and were allowed to condition at a temperature of 23° C. for at least 48 hours before testing.

The properties of the resulting compound are summarized in Table 13.

TABLE 13

| Properties | Test Method | Units | Example 13 |
|---|---|---|---|
| Tensile Modulus | ASTM D638 | MPa. | 2241 |
| Tensile Strength @ Yield | ASTM D 638 | MPa. | 75.9 |
| Tensile Strength @ Break | ASTM D638 | MPa. | 75.9 |
| Strain @ Break | ASTM D638 | % | 4.2 |
| Flexural Modulus | ASTM D790 | MPa. | 2688 |

TABLE 13-continued

| Properties | Test Method | Units | Example 13 |
|---|---|---|---|
| Flexural Stress | ASTM D790 | MPa. | 106.7 |
| Notched Izod @ 23° C. | ASTM D256 | ft · lb/in | 1.01 |
| HDT @ 66 psi. | ASTM D648 | ° C. | |
| @ 264 psi. | | ° C. | 75.5 |

EXAMPLE 14

The main feeder of a ZE 25 twin screw extruder (L/D=44) operated at a rate of 500 r.p.m. and a set temperature profile of 25° C. (feed), 250° C. (Zone 2), 275° C. (Zone 3), 280° C. (Zone 4), 285° C. (Zone 5), 285° C. (Zone 6), 275° C. (Zone 7), 270° C. (Zone 8), 270° C. (Zone 9), 270° C. (Zone 10), 265° C. (Zone 11), 265° C. (die), was charged with (through main hopper) 76.55 parts of nylon 6,6 Poly(hexamethylene adipamide), 3 parts of Royaltuf® 485 maleic anhydride grafted EPDM from Crompton Corporation, 0.20 parts of ELC-1010 tetrakis methylene(3,5-di-t-butyl-4-hydroxyhydrocinnamate)methane from Ed-Lynn Network Polymers, and 0.25 parts of ELC-626 (also available as Ultranox® 626 from Ciba Giegy) is bis(2,4-di-t-butylphenyl)pentaerythritol diphosphite stabilizer from Ed-Lynn Network Polymers. While 20 part of chopped glass fibers Vetrotex® 995 from Saint Gobain, was charged continuously at a controlled rate from side feeder. The product was pelletized and dried at 80° C. for 4 hours to a moisture content of less than 0.05% by weight. Then, test specimens were made by injection molding and were allowed to condition at a temperature of 23° C. for at least 48 hours before testing.

The properties of the resulting compound are summarized in Table 14.

TABLE 14

| Properties | Test Method | Units | Example 14 |
|---|---|---|---|
| Tensile Modulus | ASTM D638 | MPa. | 3846 |
| Tensile Strength @ Yield | ASTM D 638 | MPa. | 122.8 |
| Tensile Strength @ Break | ASTM D638 | MPa. | 122.8 |
| Strain @ Break | ASTM D638 | % | 3.8 |
| Flexural Modulus | ASTM D790 | MPa. | 6183 |
| Flexural Stress | ASTM D790 | MPa. | 159.8 |
| Notched Izod @ 23° C. | ASTM D256 | ft · lb/in | 1.09 |
| HDT @ 66 psi. | ASTM D648 | ° C. | 258 |
| @ 264 psi. | | ° C. | 243 |

EXAMPLE 15

The main feeder of a ZE 25 twin screw extruder (L/D=44) operated at a rate of 500 r.p.m. and a set temperature profile of 25° C. (feed), 250° C. (Zone 2), 275° C. (Zone 3), 280° C. (Zone 4), 285° C. (Zone 5), 285° C. (Zone 6), 275° C. (Zone 7), 270° C. (Zone 8), 270° C. (Zone 9), 270° C. (Zone 10), 265° C. (Zone 11), 265° C. (die), was charged with (through main hopper) 76.55 parts of nylon 6, 3 parts of Royaltuf® 485 maleic anhydride grafted EPDM from Crompton Corporation, 0.20 parts of ELC-1010 tetrakis methylene (3,5-di-t-butyl-4-hydroxyhydrocinnamate)methane from Ed-Lynn Network Polymers, and 0.25 parts of ELC-626 (also available as Ultranox® 626 from Ciba Giegy) is bis(2,4-di-t-butylphenyl)pentaerythritol diphosphite stabilizer from Ed-Lynn Network Polymers. While 20 part of chopped glass fibers Vetrotex® 995 from Saint Gobain, was charged continuously at a controlled rate from side feeder. The product was pelletized and dried at 80° C. for 4 hours to a moisture content of less than 0.05% by weight. Then, test specimens were made by injection molding and were allowed to condition at a temperature of 23° C. for at least 48 hours before testing.

The properties of the resulting compound are summarized in Table 15.

TABLE 15

| Properties | Test Method | Units | Example 15 |
|---|---|---|---|
| Tensile Modulus | ASTM D638 | MPa. | 3968 |
| Tensile Strength @ Yield | ASTM D 638 | MPa. | 113.2 |
| Tensile Strength @ Break | ASTM D638 | MPa. | 113.4 |
| Strain @ Break | ASTM D638 | % | 3.6 |
| Flexural Modulus | ASTM D790 | MPa. | 5428 |
| Flexural Stress | ASTM D790 | MPa. | 141.4 |
| Notched Izod @ 23° C. | ASTM D256 | ft · lb/in | 1.25 |
| HDT @ 66 psi. | ASTM D648 | ° C. | 217 |
| @ 264 psi. | | ° C. | 198 |

EXAMPLE 16

The main feeder of a ZE 25 twin screw extruder (L/D=44) operated at a rate of 500 r.p.m. and a set temperature profile of 25° C. (feed), 250° C. (Zone 2), 275° C. (Zone 3), 280° C. (Zone 4), 285° C. (Zone 5), 285° C. (Zone 6), 275° C. (Zone 7), 270° C. (Zone 8), 270° C. (Zone 9), 270° C. (Zone 10), 265° C. (Zone 11), 265° C. (die), was charged with (through main hopper) 63.55 parts of nylon 6,6 Poly(hexamethylene adipamide), 3 parts of Royaltuf® 485 maleic anhydride grafted EPDM from Crompton Corporation, 0.20 parts of ELC-1010 tetrakis methylene (3,5-di-t-butyl-4-hydroxyhydrocinnamate)methane from Ed-Lynn Network Polymers, and 0.25 parts of ELC-626 (also available as Ultranox® 626 from Ciba Giegy) is bis(2,4-di-t-butylphenyl)pentaerythritol diphosphite stabilizer from Ed-Lynn Network Polymers. While 33 parts of chopped glass fibers Vetrotex® 995 from Saint Gobain, was charged continuously at a controlled rate from side feeder. The product was pelletized and dried at 80° C. for 4 hours to a moisture content of less than 0.05% by weight. Then, test specimens were made by injection molding and were allowed to condition at a temperature of 23° C. for at least 48 hours before testing.

The properties of the resulting compound are summarized in Table 16.

TABLE 16

| Properties | Test Method | Units | Example 16 |
|---|---|---|---|
| Tensile Modulus | ASTM D638 | MPa. | 4033 |
| Tensile Strength @ Yield | ASTM D 638 | MPa. | 122.3 |
| Tensile Strength @ Break | ASTM D638 | MPa. | 122.9 |
| Strain @ Break | ASTM D638 | % | 3.6 |
| Flexural Modulus | ASTM D790 | MPa. | 6473 |
| Flexural Stress | ASTM D790 | MPa. | 151.3 |
| Notched Izod @ 23° C. | ASTM D256 | ft · lb/in | 1.12 |
| HDT @ 66 psi. | ASTM D648 | ° C. | |
| @ 264 psi. | | ° C. | |

EXAMPLE 17

The main feeder of a ZE 25 twin screw extruder (L/D=44) operated at a rate of 500 r.p.m. and a set temperature profile of 25° C. (feed), 250° C. (Zone 2), 275° C. (Zone 3), 280° C. (Zone 4), 285° C. (Zone 5), 285° C. (Zone 6), 275° C. (Zone 7), 270° C. (Zone 8), 270° C. (Zone 9), 270° C. (Zone 10), 265° C. (Zone 11), 265° C. (die), was charged with (through main hopper) 63.55 parts of nylon 6, 3 parts of Royaltuf® 485 maleic anhydride grafted EPDM from Crompton Corporation, 0.20 parts of ELC-1010 tetrakis methylene(3,5-di-t-butyl-4-hydroxyhydrocinnamate)methane from Ed-Lynn Network Polymers, and 0.25 parts of ELC-626 (also available as Ultranox® 626 from Ciba Giegy) is bis(2,4-di-t-butylphenyl)pentaerythritol diphosphite stabilizer from Ed-Lynn Network Polymers. While 33 part of chopped glass fibers Vetrotex® 995 from Saint Gobain, was charged continuously at a controlled rate from side feeder. The product was pelletized and dried at 80° C. for 4 hours to a moisture content of less than0.05% by weight. Then, test specimens were made by injection molding and were allowed to condition at a temperature of 23° C. for at least 48 hours before testing.

The properties of the resulting compound are summarized in Table 17.

TABLE 17

| Properties | Test Method | Units | Example 17 |
|---|---|---|---|
| Tensile Modulus | ASTM D638 | MPa. | 3767 |
| Tensile Strength @ Yield | ASTM D 638 | MPa. | 104.2 |
| Tensile Strength @ Break | ASTM D638 | MPa. | 104.1 |
| Strain @ Break | ASTM D638 | % | 3.5 |
| Flexural Modulus | ASTM D790 | MPa. | 5543 |
| Flexural Stress | ASTM D790 | MPa. | 131.3 |
| Notched Izod @ 23° C. | ASTM D256 | ft · lb/in | 1.24 |
| HDT @ 66 psi. | ASTM D648 | ° C. | |
| @ 264 psi. | | ° C. | 197 |

EXAMPLE 18

The main feeder of a ZE 25 twin screw extruder (L/D=44) operated at a rate of 500 r.p.m. and a set temperature profile of 25° C. (feed), 250° C. (Zone 2), 275° C. (Zone 3), 280° C. (Zone 4), 285° C. (Zone 5), 285° C. (Zone 6), 275° C. (Zone 7), 270° C. (Zone 8), 270° C. (Zone 9), 270° C. (Zone 10), 265° C. (Zone 11), 265° C. (die), was charged with (through main hopper) 61.12 parts of nylon 6,6 Poly(hexamethylene adipamide), 15.28 parts of Amodel® AT 1002 Polyphthalamide, 0.20 parts of ELC-1010 tetrakis methylene(3,5-di-t-butyl-4-hydroxyhydrocinnamate)methane from Ed-Lynn Network Polymers, and 0.20 parts of ELC-626 (also available as Ultranox® 626 from Ciba Giegy) is bis(2,4-di-t-butylphenyl)pentaerythritol diphosphite stabilizer from Ed-Lynn Network Polymers. While 23 parts of chopped glass fibers Vetrotex® 995 from Saint Gobain, was charged continuously at a controlled rate from side feeder. The product was pelletized and dried at 80° C. for 4 hours to a moisture content of less than 0.05% by weight. Then, test specimens were made by injection molding and were allowed to condition at a temperature of 23° C. for at least 48 hours before testing.

The properties of the resulting compound are summarized in Table 18.

TABLE 18

| Properties | Test Method | Units | Example 18 |
|---|---|---|---|
| Tensile Modulus | ASTM D638 | MPa. | 4518 |
| Tensile Strength @ Yield | ASTM D 638 | MPa. | 148.2 |
| Tensile Strength @ Break | ASTM D638 | MPa. | 148.2 |
| Strain @ Break | ASTM D638 | % | 4.0 |
| Flexural Modulus | ASTM D790 | MPa. | 7192 |
| Flexural Stress | ASTM D790 | MPa. | 203.3 |
| Notched Izod @ 23° C. | ASTM D256 | ft · lb/in | 1.05 |
| HDT @ 66 psi. | ASTM D648 | ° C. | |
| @ 264 psi. | | ° C. | |

EXAMPLE 19

The main feeder of a ZE 25 twin screw extruder (L/D=44) operated at a rate of 500 r.p.m. and a set temperature profile of 25° C. (feed), 250° C. (Zone 2), 275° C. (Zone 3), 280° C. (Zone 4), 285° C. (Zone 5), 285° C. (Zone 6), 275° C. (Zone 7), 270° C. (Zone 8), 270° C. (Zone 9), 270° C. (Zone 10), 265° C. (Zone 11), 265° C. (die), was charged with (through main hopper) 58.08 parts of nylon 6,6 Poly(hexamethylene adipamide), 14.52 parts of Amodel® AT 1002 Polyphthalamide, 4 parts of Royaltuf® 485 maleic anhydride grafted EPDM from Crompton Corporation, 0.20 parts of ELC-1010 tetrakis methylene(3,5-di-t-butyl-4-hydroxyhydrocinnamate)methane from Ed-Lynn Network Polymers, and 0.20 parts of ELC-626 (also available as Ultranox® 626 from Ciba Giegy) is bis(2,4-di-t-butylphenyl)pentaerythritol diphosphite stabilizer from Ed-Lynn Network Polymers. While 23 parts of chopped glass fibers Vetrotex® 995 from Saint Gobain, was charged continuously at a controlled rate from side feeder. The product was pelletized and dried at 80° C. for 4 hours to a moisture content of less than 0.05% by weight. Then, test specimens were made by injection molding and were allowed to condition at a temperature of 23° C. for at least 48 hours before testing.

The properties of the resulting compound are summarized in Table 19.

TABLE 19

| Properties | Test Method | Units | Example 19 |
| --- | --- | --- | --- |
| Tensile Modulus | ASTM D638 | MPa. | 3176 |
| Tensile Strength @ Yield | ASTM D 638 | MPa. | 114 |
| Tensile Strength @ Break | ASTM D638 | MPa. | 115 |
| Strain @ Break | ASTM D638 | % | 4.2 |
| Flexural Modulus | ASTM D790 | MPa. | 5381 |
| Flexural Stress | ASTM D790 | MPa. | 152.6 |
| Notched Izod @ 23° C. | ASTM D256 | ft · lb/in | 0.9 |
| HDT @ 66 psi. | ASTM D648 | ° C. | |
| @ 264 psi. | | ° C. | 229 |

EXAMPLE 20

The main feeder of a ZE 25 twin screw extruder (L/D=44) operated at a rate of 500 r.p.m. and a set temperature profile of 25° C. (feed), 250° C. (Zone 2), 275° C. (Zone 3), 280° C. (Zone 4), 285° C. (Zone 5), 285° C. (Zone 6), 275° C. (Zone 7), 270° C. (Zone 8), 270° C. (Zone 9), 270° C. (Zone 10), 265° C. (Zone 11), 265° C. (die), was charged with (through main hopper) 45.84 parts of nylon 6,6 Poly(hexamethylene adipamide), 15.28 parts of Amodel® AT 1002 Polyphthalamide, 15.28 parts of Corterra® 200 Poly(trimethylene terephthalate), 0.20 parts of ELC-1010 tetrakis methylene(3,5-di-t-butyl-4-hydroxyhydrocinnamate)methane from Ed-Lynn Network Polymers, and 0.20 parts of ELC-626 (also available as Ultranox® 626 from Ciba Giegy) is bis(2,4-di-t-butylphenyl)pentaerythritol diphosphite stabilizer from Ed-Lynn Network Polymers. While 23 parts of chopped glass fibers Vetrotex® 995 from Saint Gobain, was charged continuously at a controlled rate from side feeder. The product was pelletized and dried at 80° C. for 4 hours to a moisture content of less than 0.05% by weight. Then, test specimens were made by injection molding and were allowed to condition at a temperature of 23° C. for at least 48 hours before testing.

The properties of the resulting compound are summarized in Table 20.

TABLE 20

| Properties | Test Method | Units | Example 20 |
| --- | --- | --- | --- |
| Tensile Modulus | ASTM D638 | MPa. | 4322 |
| Tensile Strength @ Yield | ASTM D 638 | MPa. | 133.3 |
| Tensile Strength @ Break | ASTM D638 | MPa. | 133.6 |
| Strain @ Break | ASTM D638 | % | 3.8 |
| Flexural Modulus | ASTM D790 | MPa. | 7025 |
| Flexural Stress | ASTM D790 | MPa. | 168.7 |
| Notched Izod @ 23° C. | ASTM D256 | ft · lb/in | 0.87 |
| HDT @ 66 psi. | ASTM D648 | ° C. | |
| @ 264 psi. | | ° C. | 227.3 |

EXAMPLE 21

The main feeder of a ZE 25 twin screw extruder (L/D=44) operated at a rate of 500 r.p.m. and a set temperature profile of 25° C. (feed), 250° C. (Zone 2), 275° C. (Zone 3), 280° C. (Zone 4), 285° C. (Zone 5), 285° C. (Zone 6), 275° C. (Zone 7), 270° C. (Zone 8), 270° C. (Zone 9), 270° C. (Zone 10), 265° C. (Zone 11), 265° C. (die), was charged with (through main hopper) 44.64 parts of nylon 6,6 Poly(hexamethylene adipamide), 14.88 parts of Amodel® AT 1002 Polyphthalamide, 14.88 parts of Corterra® 200 Poly(trimethylene terephthalate), 5 parts of Lotader® 8900 terpolymer of ethylene, methyl methacrylate and glycidyl methacrylate, 0.20 parts of ELC-1010 tetrakis methylene(3,5-di-t-butyl-4-hydroxyhydrocinnamate)methane from Ed-Lynn Network Polymers, and 0.20 parts of ELC-626 (also available as Ultranox® 626 from Ciba Giegy) is bis(2,4-di-t-butylphenyl)pentaerythritol diphosphite stabilizer from Ed-Lynn Network Polymers. While 20 parts of chopped glass fibers Vetrotex® 995 from Saint Gobain, was charged continuously at a controlled rate from side feeder. The product was pelletized and dried at 80° C. for 4 hours to a moisture content of less than 0.05% by weight. Then, test specimens were made by injection molding and were allowed to condition at a temperature of 23° C. for at least 48 hours before testing.

The properties of the resulting compound are summarized in Table 21.

TABLE 21

| Properties | Test Method | Units | Example 21 |
| --- | --- | --- | --- |
| Tensile Modulus | ASTM D638 | MPa. | 3520 |
| Tensile Strength @ Yield | ASTM D 638 | MPa. | 125.4 |
| Tensile Strength @ Break | ASTM D638 | MPa. | 125.4 |
| Strain @ Break | ASTM D638 | % | 4.4 |
| Flexural Modulus | ASTM D790 | MPa. | 6549 |
| Flexural Stress | ASTM D790 | MPa. | 177 |
| Notched Izod @ 23° C. | ASTM D256 | ft · lb/in | 1.31 |
| HDT @ 66 psi. | ASTM D648 | ° C. | |
| @ 264 psi. | | ° C. | 219 |

EXAMPLE 22

The main feeder of a ZE 25 twin screw extruder (L/D=44) operated at a rate of 500 r.p.m. and a set temperature profile of 25° C. (feed), 250° C. (Zone 2), 275° C. (Zone 3), 280° C. (Zone 4), 285° C. (Zone 5), 285° C. (Zone 6), 275° C. (Zone 7), 270° C. (Zone 8), 270° C. (Zone 9), 270° C. (Zone 10), 265° C. (Zone 11), 265° C. (die), was charged with (through main hopper) 42.84 parts of nylon 6,6 Poly(hexamethylene adipamide), 14.28 parts of Amodel® AT 1002 Polyphthalamide, 14.28 parts of Corterra® 200 Poly(trimethylene terephthalate), 4 parts of Lotader® 8900 terpolymer of ethylene, methyl methacrylate and glycidyl methacrylate, 4 parts of Royaltuf® 485 maleic anhydride grafted EPDM from Crompton Corporation, 0.20 parts of ELC-1010 tetrakis methylene(3,5-di-t-butyl-4-hydroxyhydrocinnamate)methane from Ed-Lynn Network Polymers, and 0.20 parts of ELC-626 (also available as Ultranox® 626 from Ciba Giegy) is bis(2,4-di-t-butylphenyl)pentaerythritol diphosphite stabilizer from Ed-Lynn Network Polymers. While 20 parts of chopped glass fibers Vetrotex® 995 from Saint Gobain, was charged continuously at a controlled rate from side feeder. The product was pelletized and dried at 80° C. for 4 hours to a moisture content of less than 0.05% by weight. Then, test specimens were made by injection molding and were allowed to condition at a temperature of 23° C. for at least 48 hours before testing.

The properties of the resulting compound are summarized in Table 22.

TABLE 22

| Properties | Test Method | Units | Example 22 |
| --- | --- | --- | --- |
| Tensile Modulus | ASTM D638 | MPa. | 3056 |
| Tensile Strength @ Yield | ASTM D 638 | MPa. | 108.2 |
| Tensile Strength @ Break | ASTM D638 | MPa. | 108.4 |
| Strain @ Break | ASTM D638 | % | 4.4 |
| Flexural Modulus | ASTM D790 | MPa. | 5831 |
| Flexural Stress | ASTM D790 | MPa. | 158.8 |
| Notched Izod @ 23° C. | ASTM D256 | ft · lb/in | 1.29 |
| HDT @ 66 psi. | ASTM D648 | ° C. | |
| @ 264 psi. | | ° C. | 217 |

EXAMPLE 23

The main feeder of a ZE 25 twin screw extruder (L/D=44) operated at a rate of 500 r.p.m. and a set temperature profile of 25° C. (feed), 250° C. (Zone 2), 275° C. (Zone 3), 280° C. (Zone 4), 285° C. (Zone 5), 285° C. (Zone 6), 275° C. (Zone 7), 270° C. (Zone 8), 270° C. (Zone 9), 270° C. (Zone 10), 265° C. (Zone 11), 265° C. (die), was charged with (through main hopper) 50.68 parts of nylon 6,6 Poly(hexamethylene adipamide), 21.72 parts of Corterra® 200 Poly(trimethylene terephthalate), 3 parts of Lotader® 8900 terpolymer of ethylene, methyl methacrylate and glycidyl methacrylate, 4 parts of Royaltuf® 485 maleic anhydride grafted EPDM from Crompton Corporation, 0.20 parts of ELC-1010 tetrakis methylene(3,5-di-t-butyl-4-hydroxyhydrocinnamate)methane from Ed-Lynn Network Polymers, and 0.20 parts of ELC-626 (also available as Ultranox® 626 from Ciba Giegy) is bis(2,4-di-t-butylphenyl)pentaerythritol diphosphite stabilizer from Ed-Lynn Network Polymers. While 20 parts of chopped glass fibers Vetrotex® 995 from Saint Gobain, was charged continuously at a controlled rate from side feeder. The product was pelletized and dried at 80° C. for 4 hours to a moisture content of less than 0.05% by weight. Then, test specimens were made by injection molding and were allowed to condition at a temperature of 23° C. for at least 48 hours before testing.

The properties of the resulting compound are summarized in Table 23.

TABLE 23

| Properties | Test Method | Units | Example 23 |
| --- | --- | --- | --- |
| Tensile Modulus | ASTM D638 | MPa. | 3260 |
| Tensile Strength @ Yield | ASTM D 638 | MPa. | 116.1 |
| Tensile Strength @ Break | ASTM D638 | MPa. | 115.8 |
| Strain @ Break | ASTM D638 | % | 4.4 |

TABLE 23-continued

| Properties | Test Method | Units | Example 23 |
| --- | --- | --- | --- |
| Flexural Modulus | ASTM D790 | MPa. | 6100 |
| Flexural Stress | ASTM D790 | MPa. | 156.1 |
| Notched Izod @ 23° C. | ASTM D256 | ft · lb/in | 1.19 |
| HDT @ 66 psi. | ASTM D648 | ° C. | |
| @ 264 psi. | | ° C. | 231.8 |

EXAMPLE 24

The main feeder of a ZE 25 twin screw extruder (L/D=44) operated at a rate of 500 r.p.m. and a set temperature profile of 25° C. (feed), 250° C. (Zone 2), 275° C. (Zone 3), 280° C. (Zone 4), 285° C. (Zone 5), 285° C. (Zone 6), 275° C. (Zone 7), 270° C. (Zone 8), 270° C. (Zone 9), 270° C. (Zone 10), 265° C. (Zone 11), 265° C. (die), was charged with (through main hopper) 14.32 parts of Amodel® AT 1002 Polyphthalamide, 58.08 parts of Corterra® 200 Poly(trimethylene terephthalate), 4 parts of Lotader® 8900 terpolymer of ethylene, methyl methacrylate and glycidyl methacrylate, 3 parts of Royaltuf® 485 maleic anhydride grafted EPDM from Crompton Corporation, 0.20 parts of ELC-1010 tetrakis methylene(3,5-di-t-butyl-4-hydroxyhydrocinnamate)methane from Ed-Lynn Network Polymers, and 0.20 parts of ELC-626 (also available as Ultranox® 626 from Ciba Giegy) is bis(2,4-di-t-butylphenyl)pentaerythritol diphosphite stabilizer from Ed-Lynn Network Polymers. While 20 parts of chopped glass fibers Vetrotex® 995 from Saint Gobain, was charged continuously at a controlled rate from side feeder. The product was pelletized and dried at 80° C. for 4 hours to a moisture content of less than 0.05% by weight. Then, test specimens were made by injection molding and were allowed to condition at a temperature of 23° C. for at least 48 hours before testing.

The properties of the resulting compound are summarized in Table 24.

TABLE 24

| Properties | Test Method | Units | Example 24 |
| --- | --- | --- | --- |
| Tensile Modulus | ASTM D638 | MPa. | 3706 |
| Tensile Strength @ Yield | ASTM D 638 | MPa. | 119.5 |
| Tensile Strength @ Break | ASTM D638 | MPa. | 119.5 |
| Strain @ Break | ASTM D638 | % | 4.0 |
| Flexural Modulus | ASTM D790 | MPa. | 7566 |
| Flexural Stress | ASTM D790 | MPa. | 151.3 |
| Notched Izod @ 23° C. | ASTM D256 | ft · lb/in | 1.27 |
| HDT @ 66 psi. | ASTM D648 | ° C. | |
| @ 264 psi. | | ° C. | 201 |

EXAMPLE 25

The main feeder of a ZE 25 twin screw extruder (L/D=44) operated at a rate of 500 r.p.m. and a set temperature profile of 25° C. (feed), 250° C. (Zone 2), 275° C. (Zone 3), 280° C. (Zone 4), 285° C. (Zone 5), 285° C. (Zone 6), 275° C. (Zone 7), 270° C. (Zone 8), 270° C. (Zone 9), 270° C. (Zone 10), 265° C. (Zone 11), 265° C. (die), was charged with (through main hopper) 57.12 parts of nylon 6,6 Poly(hexamethylene adipamide), 7.14 parts of Amodel® AT 1002 Polyphthalamide, 7.14 parts of Corterra® 200 Poly(trimethylene terephthalate), 2 parts of Lotader® 8900 terpolymer of ethylene, methyl methacrylate and glycidyl methacrylate, 3 parts of Royaltuf® 485 maleic anhydride grafted EPDM from Crompton Corporation, 0.20 parts of ELC-1010 tetrakis methylene(3,5-di-t-butyl-4-hydroxyhydrocinnamate)methane from Ed-Lynn Network Polymers, and 0.20 parts of ELC-626 (also available as Ultranox® 626 from Ciba Giegy) is bis(2,4-di-t-butylphenyl)pentaerythritol diphosphite stabilizer from Ed-Lynn Network Polymers. While 23 parts of chopped glass fibers Vetrotex® 995 from Saint Gobain, was charged continuously at a controlled rate from side feeder. The product was pelletized and dried at 80° C. for 4 hours to a moisture content of less than 0.05% by weight. Then, test specimens were made by injection molding and were allowed to condition at a temperature of 23° C. for at least 48 hours before testing.

The properties of the resulting compound are summarized in Table 25.

TABLE 25

| Properties | Test Method | Units | Example 25 |
| --- | --- | --- | --- |
| Tensile Modulus | ASTM D638 | MPa. | 4501 |
| Tensile Strength @ Yield | ASTM D 638 | MPa. | 136.5 |
| Tensile Strength @ Break | ASTM D638 | MPa. | 136.3 |
| Strain @ Break | ASTM D638 | % | 4.0 |
| Flexural Modulus | ASTM D790 | MPa. | 7700 |
| Flexural Stress | ASTM D790 | MPa. | 195.2 |
| Notched Izod @ 23° C. | ASTM D256 | ft · lb/in | 1.6 |
| HDT @ 66 psi. | ASTM D648 | ° C. | |
| @ 264 psi. | | ° C. | 240 |

EXAMPLE 26

The main feeder of a ZE 25 twin screw extruder (L/D=44) operated at a rate of 500 r.p.m. and a set temperature profile of 25° C. (feed), 250° C. (Zone 2), 275° C. (Zone 3), 280° C. (Zone 4), 285° C. (Zone 5), 285° C. (Zone 6), 275° C. (Zone 7), 270° C. (Zone 8), 270° C. (Zone 9), 270° C. (Zone 10), 265° C. (Zone 11), 265° C. (die), was charged with (through main hopper) 54.10 parts of nylon 6,6 Poly(hexamethylene adipamide), 8.40 parts of Amodel® AT 1002 Polyphthalamide, 7.0 parts of Corterra® 200 Poly(trimethylene terephthalate), 2 parts of Lotader® 8900 terpolymer of ethylene, methyl methacrylate and glycidyl methacrylate, 4.5 parts of Royaltuf® 485 maleic anhydride grafted EPDM from Crompton Corporation, 0.20 parts of ELC-1010 tetrakis methylene(3,5-di-t-butyl-4-hydroxyhydrocinnamate)methane from Ed-Lynn Network Polymers, and 0.20 parts of ELC-626 (also available as Ultranox® 626 from Ciba Giegy) is bis(2,4-di-t-butylphenyl)pentaerythritol diphosphite stabilizer from Ed-Lynn Network Polymers. While 25 parts of chopped glass fibers Vetrotex® 995 from Saint Gobain, was charged continuously at a controlled rate from side feeder. The product was pelletized and dried at 80° C. for 4 hours to a moisture content of less than 0.05% by weight. Then, test specimens were made by injection molding and were allowed to condition at a temperature of 23° C. for at least 48 hours before testing.

The properties of the resulting compound are summarized in Table 26.

TABLE 26

| Properties | Test Method | Units | Example 26 |
| --- | --- | --- | --- |
| Tensile Modulus | ASTM D638 | MPa. | 3432 |
| Tensile Strength @ Yield | ASTM D 638 | MPa. | 128.4 |
| Tensile Strength @ Break | ASTM D638 | MPa. | 127.9 |
| Strain @ Break | ASTM D638 | % | 4.6 |
| Flexural Modulus | ASTM D790 | MPa. | 6495 |

TABLE 26-continued

| Properties | Test Method | Units | Example 26 |
| --- | --- | --- | --- |
| Flexural Stress | ASTM D790 | MPa. | 188.5 |
| Notched Izod @ 23° C. | ASTM D256 | ft · lb/in | 1.78 |
| HDT @ 66 psi. | ASTM D648 | ° C. | |
| @ 264 psi. | | ° C. | 238 |

EXAMPLE 27

The main feeder of a ZE 25 twin screw extruder (L/D=44) operated at a rate of 500 r.p.m. and a set temperature profile of 25° C. (feed), 250° C. (Zone 2), 275° C. (Zone 3), 280° C. (Zone 4), 285° C. (Zone 5), 285° C. (Zone 6), 275° C. (Zone 7), 270° C. (Zone 8), 270° C. (Zone 9), 270° C. (Zone 10), 265° C. (Zone 11), 265° C. (die), was charged with (through main hopper) 31.71 parts of nylon 6,6 Poly(hexamethylene adipamide), 13.59 parts of Corterra® 200 Poly(trimethylene terephthalate), 6 parts of Royaltuf® 485 maleic anhydride grafted EPDM from Crompton Corporation, 0.20 parts of ELC-1010 tetrakis methylene(3,5-di-t-butyl-4-hydroxyhydrocinnamate)methane from Ed-Lynn Network Polymers, and 0.20 parts of ELC-626 (also available as Ultranox® 626 from Ciba Giegy) is bis(2,4-di-t-butylphenyl)pentaerythritol diphosphite stabilizer from Ed-Lynn Network Polymers. While 45 parts of chopped glass fibers Vetrotex® 995 from Saint Gobain, was charged continuously at a controlled rate from side feeder. The product was pelletized and dried at 80° C. for 4 hours to a moisture content of less than 0.05% by weight. Then, test specimens were made by injection molding and were allowed to condition at a temperature of 23° C. for at least 48 hours before testing.

The properties of the resulting compound are summarized in Table 27.

TABLE 27

| Properties | Test Method | Units | Example 27 |
| --- | --- | --- | --- |
| Tensile Modulus | ASTM D638 | MPa. | 3960.3 |
| Tensile Strength @ Yield | ASTM D 638 | MPa. | 136.2 |
| Tensile Strength @ Break | ASTM D638 | MPa. | 136.2 |
| Strain @ Break | ASTM D638 | % | 4.4 |
| Flexural Modulus | ASTM D790 | MPa. | 9539.7 |
| Flexural Stress | ASTM D790 | MPa. | 191 |
| Notched Izod @ 23° C. | ASTM D256 | ft · lb/in | 1.83 |
| HDT @ 66 psi. | ASTM D648 | ° C. | |
| @ 264 psi. | | ° C. | 238.4 |

EXAMPLE 28

The main feeder of a ZE 25 twin screw extruder (L/D=44) operated at a rate of 500 r.p.m. and a set temperature profile of 25° C. (feed), 250° C. (Zone 2), 275° C. (Zone 3), 280° C. (Zone 4), 285° C. (Zone 5), 285° C. (Zone 6), 275° C. (Zone 7), 270° C. (Zone 8), 270° C. (Zone 9), 270° C. (Zone 10), 265° C. (Zone 11), 265° C. (die), was charged with (through main hopper) 27.18 parts of nylon 6,6 Poly(hexamethylene adipamide), 18.12 parts of Corterra® 200 Poly(trimethylene terephthalate), 8 parts of Royaltuf® 485 maleic anhydride grafted EPDM from Crompton Corporation, 0.20 parts of ELC-1010 tetrakis methylene(3,5-di-t-butyl-4-hydroxyhydrocinnamate)methane from Ed-Lynn Network Polymers, and 0.20 parts of ELC-626 (also available as Ultranox® 626 from Ciba Giegy) is bis(2,4-di-t-butylphenyl)pentaerythritol diphosphite stabilizer from Ed-Lynn Network Polymers. While 45 parts of chopped glass fibers Vetrotex® 995 from Saint Gobain, was charged continuously at a controlled rate from side feeder. The product was pelletized and dried at 80° C. for 4 hours to a moisture content of less than 0.05% by weight. Then, test specimens were made by injection molding and were allowed to condition at a temperature of 23° C. for at least 48 hours before testing.

The properties of the resulting compound are summarized in Table 28.

TABLE 28

| Properties | Test Method | Units | Example 28 |
| --- | --- | --- | --- |
| Tensile Modulus | ASTM D638 | MPa. | 3725 |
| Tensile Strength @ Yield | ASTM D 638 | MPa. | 114 |
| Tensile Strength @ Break | ASTM D638 | MPa. | 113.7 |
| Strain @ Break | ASTM D638 | % | 3.6 |
| Flexural Modulus | ASTM D790 | MPa. | 9476.2 |
| Flexural Stress | ASTM D790 | MPa. | 151 |
| Notched Izod @ 23° C. | ASTM D256 | ft · lb/in | 1.59 |
| HDT @ 66 psi. | ASTM D648 | ° C. | |
| @ 264 psi. | | ° C. | 228.2 |

EXAMPLE 29

The main feeder of a ZE 25 twin screw extruder (L/D=44) operated at a rate of 500 r.p.m. and a set temperature profile of 25° C. (feed), 250° C. (Zone 2), 275° C. (Zone 3), 280° C. (Zone 4), 285° C. (Zone 5), 285° C. (Zone 6), 275° C. (Zone 7), 270° C. (Zone 8), 270° C. (Zone 9), 270° C. (Zone 10), 265° C. (Zone 11), 265° C. (die), was charged with (through main hopper) 24 parts of nylon 6,6 Poly(hexamethylene adipamide), 11.60 parts of Corterra® 200 Poly(trimethylene terephthalate), 6 parts of Royaltuf® 485 maleic anhydride grafted EPDM from Crompton Corporation, 4 parts of Lotader® 8900 terpolymer of ethylene, methyl methacrylate and glycidyl methacrylate, 4 parts of Lotader® 4700, 0.20 parts of ELC-1010 tetrakis methylene(3,5-di-t-butyl-4-hydroxyhydrocinnamate)methane from Ed-Lynn Network Polymers, and 0.20 parts of ELC-626 (also available as Ultranox® 626 from Ciba Giegy) is bis(2,4-di-t-butylphenyl)pentaerythritol diphosphite stabilizer from Ed-Lynn Network Polymers. While 50 parts of chopped glass fibers Vetrotex® 995 from Saint Gobain, was charged continuously at a controlled rate from side feeder. The product was pelletized and dried at 80° C. for 4 hours to a moisture content of less than 0.05% by weight. Then, test specimens were made by injection molding and were allowed to condition at a temperature of 23° C. for at least 48 hours before testing.

The properties of the resulting compound are summarized in Table 29.

TABLE 29

| Properties | Test Method | Units | Example 29 |
| --- | --- | --- | --- |
| Tensile Modulus | ASTM D638 | MPa. | 3414 |
| Tensile Strength @ Yield | ASTM D 638 | MPa. | 101 |
| Tensile Strength @ Break | ASTM D638 | MPa. | 101 |
| Strain @ Break | ASTM D638 | % | 4.6 |
| Flexural Modulus | ASTM D790 | MPa. | 9663.8 |
| Flexural Stress | ASTM D790 | MPa. | 192 |
| Notched Izod @ 23° C. | ASTM D256 | ft · lb/in | 2.51 |
| HDT @ 66 psi. | ASTM D648 | ° C. | |
| @ 264 psi. | | ° C. | 235.3 |

EXAMPLE 30

The main feeder of a ZE 25 twin screw extruder (L/D=44) operated at a rate of 500 r.p.m. and a set temperature profile of 25° C. (feed), 250° C. (Zone 2), 275° C. (Zone 3), 280° C. (Zone 4), 285° C. (Zone 5), 285° C. (Zone 6), 275° C. (Zone 7), 270° C. (Zone 8), 270° C. (Zone 9), 270° C. (Zone 10), 265° C. (Zone 11), 265° C. (die), was charged with (through main hopper) 29.6 parts of nylon 6,6 Poly(hexamethylene adipamide), 12.0 parts of Corterra® 200 Poly(trimethylene terephthalate), 4 parts of Royaltuf® 485 maleic anhydride grafted EPDM from Crompton Corporation, 2 parts of Lotader® 8900 terpolymer of ethylene, methyl methacrylate and glycidyl methacrylate, 2 parts of Lotader® 4700, 0.20 parts of ELC-1010 tetrakis methylene(3,5-di-t-butyl-4-hydroxyhydrocinnamate)methane from Ed-Lynn Network Polymers, and 0.20 parts of ELC-626 (also available as Ultranox® 626 from Ciba Giegy) is bis(2,4-di-t-butylphenyl)pentaerythritol diphosphite stabilizer from Ed-Lynn Network Polymers. While 50 parts of chopped glass fibers Vetrotex® 995 from Saint Gobain, was charged continuously at a controlled rate from side feeder. The product was pelletized and dried at 80° C. for 4 hours to a moisture content of less than 0.05% by weight. Then, test specimens were made by injection molding and were allowed to condition at a temperature of 23° C. for at least 48 hours before testing.

The properties of the resulting compound are summarized in Table 30.

TABLE 30

| Properties | Test Method | Units | Example 30 |
| --- | --- | --- | --- |
| Tensile Modulus | ASTM D638 | MPa. | 4090 |
| Tensile Strength @ Yield | ASTM D 638 | MPa. | 129.1 |
| Tensile Strength @ Break | ASTM D638 | MPa. | 129 |
| Strain @ Break | ASTM D638 | % | 4.3 |
| Flexural Modulus | ASTM D790 | MPa. | 9663.8 |
| Flexural Stress | ASTM D790 | MPa. | 192 |
| Notched Izod @ 23° C. | ASTM D256 | ft · lb/in | 2.14 |
| HDT @ 66 psi. | ASTM D648 | ° C. | |
| @ 264 psi. | | ° C. | 240 |

EXAMPLE 31

The main feeder of a ZE 25 twin screw extruder (L/D=44) operated at a rate of 500 r.p.m. and a set temperature profile of 25° C. (feed), 250° C. (Zone 2), 275° C. (Zone 3), 280° C. (Zone 4), 285° C. (Zone 5), 285° C. (Zone 6), 275° C. (Zone 7), 270° C. (Zone 8), 270° C. (Zone 9), 270° C. (Zone 10), 265° C. (Zone 11), 265° C. (die), was charged with (through main hopper) 46.40 parts of nylon 6,6 Poly(hexamethylene adipamide), 20.0 parts of Corterra® 200 Poly(trimethylene terephthalate), 8 parts of Royaltuf® 485 maleic anhydride grafted EPDM from Crompton Corporation, 3 parts of Lotader® 8900 terpolymer of ethylene, methyl methacrylate and glycidyl methacrylate, 2 parts of Lotader® 4700, 0.20 parts of ELC-1010 tetrakis methylene(3,5-di-t-butyl-4-hydroxyhydrocinnamate)methane from Ed-Lynn Network Polymers, and 0.20 parts of ELC-626 (also available as Ultranox® 626 from Ciba Giegy) is bis(2,4-di-t-butylphenyl)pentaerythritol diphosphite stabilizer from Ed-Lynn Network Polymers, 0.20 polyethylene wax (AC 540A from Honeywell Corporation) and 20.0 parts of Amodel® AT 1002 Polyphthalamide. The product was pelletized and dried at 80° C. for 4 hours to a moisture content of less than 0.05% by weight. Then, test specimens were made by injection molding and were allowed to condition at a temperature of 23° C. for at least 48 hours before testing.

The properties of the resulting compound are summarized in Table 31.

TABLE 31

| Properties | Test Method | Units | Example 31 |
|---|---|---|---|
| Tensile Modulus | ASTM D638 | MPa. | 1370.5 |
| Tensile Strength @ Yield | ASTM D 638 | MPa. | 55.2 |
| Tensile Strength @ Break | ASTM D638 | MPa. | 52.1 |
| Strain @ Break | ASTM D638 | % | 10.2 |
| Flexural Modulus | ASTM D790 | MPa. | 2040 |
| Flexural Stress | ASTM D790 | MPa. | 80.4 |
| Notched Izod @ 23° C. | ASTM D256 | ft · lb/in | 1.6 |
| HDT @ 66 psi. | ASTM D648 | ° C. | |
| @ 264 psi. | | ° C. | 66.5 |

EXAMPLE 32

The main feeder of a ZE 25 twin screw extruder (L/D=44) operated at a rate of 500 r.p.m. and a set temperature profile of 25° C. (feed), 250° C. (Zone 2), 275° C. (Zone 3), 280° C. (Zone 4), 285° C. (Zone 5), 285° C. (Zone 6), 275° C. (Zone 7), 270° C. (Zone 8), 270° C. (Zone 9), 270° C. (Zone 10), 265° C. (Zone 11), 265° C. (die), was charged with (through main hopper) 57.40 parts of nylon 6,6 Poly(hexamethylene adipamide), 20 parts of Royaltuf® 485 maleic anhydride grafted EPDM from Crompton Corporation, methyl methacrylate and glycidyl methacrylate, 2 parts of Lotader® 4700, 0.20 parts of ELC-1010 tetrakis methylene(3,5-di-t-butyl-4-hydroxyhydrocinnamate)methane from Ed-Lynn Network Polymers, and 0.20 parts of ELC-626 (also available as Ultranox® 626 from Ciba Giegy) is bis(2,4-di-t-butylphenyl)pentaerythritol diphosphite stabilizer from Ed-Lynn Network Polymers, 0.20 polyethylene wax (AC 540A from Honeywell Corporation) and 20.0 parts of Amodel® AT 1002 Polyphthalamide. The product was pelletized and dried at 80° C. for 4 hours to a moisture content of less than 0.05% by weight. Then, test specimens were made by injection molding and were allowed to condition at a temperature of 23° C. for at least 48 hours before testing.

The properties of the resulting compound are summarized in Table 32.

TABLE 32

| Properties | Test Method | Units | Example 32 |
|---|---|---|---|
| Tensile Modulus | ASTM D638 | MPa. | 1118.2 |
| Tensile Strength @ Yield | ASTM D 638 | MPa. | 47.7 |
| Tensile Strength @ Break | ASTM D638 | MPa. | 41.1 |
| Strain @ Break | ASTM D638 | % | 23.3 |
| Flexural Modulus | ASTM D790 | MPa. | 1719.2 |
| Flexural Stress | ASTM D790 | MPa. | 66.8 |
| Notched Izod @ 23° C. | ASTM D256 | ft · lb/in | 15.2 |
| HDT @ 66 psi. | ASTM D648 | ° C. | 119.7 |
| @ 264 psi. | | ° C. | 65.3 |

Examples 33 through 57 were prepared in the same manner as follows: the main feeder of a ZE 25 twin screw extruder (L/D=44) operated at a rate of 500 r.p.m. and a set temperature profile of 25° C. (feed), 250° C. (Zone 2), 275° C. (Zone 3), 280° C. (Zone 4), 285° C. (Zone 5), 285° C. (Zone 6), 275° C. (Zone 7), 270° C. (Zone 8), 270° C. (Zone 9), 270° C. (Zone 10), 265° C. (Zone 11), 265° C. (die), and the composition noted in Tables 33A, 33B, and 33C were each charged with through the main hopper. The physical properties of the examples are noted in Table 34.

Compounds not identified previously are Epoxy 332, which is diglycidyl ether of bisphenol A available from The Dow Chemical Company; Fusabond P MD-353D, which is a random polypropylene copolymer with a melt flow rate of 450 g/10 minutes at 190° C., 2.16 Kg available from E.I. DuPont de Mours, Inc.; Pearlthane® D11T93 which is polycaprolactone-copolyester based polyurethane from Merquinsa Corporation, Spain; Nitriimpact 1300 which is methyl-methacryatle-butadiene-styrene based rubbery modifier; Mark 135A which is isodecyl diphenyl phosphite available from Crompton Corporation; Naugard 412S which is a thioether (CAS No. 29589-76-3) available from Crompton Corporation; and Cloisite grades 25A, 93A, and 30B which are natural montmorillonite modified with quatenary salts available from Nanoclay Corporation. Grade 25A modified with dimethyl, hydrogenated tallow, 2-ethylexyl quaternary ammonium. The anion is ammonium. Grade 30B is modified with methyl, tallow, bis-2-hydroxyethyl, quaternary ammonium with chloride anion. Grade 93A is methyl, dehydrogenated tallow ammonium with HSO$_4$ anion.

TABLE 33A

Examples and Amounts of Compounds in pph of the composition

| | Example Number | | | | | | | |
|---|---|---|---|---|---|---|---|---|
| Compound | 33 | 34 | 35 | 36 | 37 | 38 | 39 | 40 |
| Nylon 66 | 94.65 | 92.65 | 92.65 | 92.65 | 92.65 | 84.66 | 79.68 | 94.60 |
| D11T93 | 5.00 | 5.00 | 5.00 | | | | | |
| Phenoxy ® PKFE | | | 2.00 | | | | | |
| Lotader ® 4700 | | | | 2.00 | | | | |
| Royaltuff ® 485 | | | | | 7.00 | 0.00 | 14.94 | 19.92 |
| Royaltuff ® 498 | | | | | | 7.00 | | |
| Ultranox ® 626 | 0.25 | 0.25 | 0.25 | 0.25 | 0.25 | | | |
| ELC ® 1010 | 0.10 | 0.10 | 0.10 | 0.10 | 0.10 | | | |
| Mark ® 135 A | | | | | | 0.20 | 0.20 | 0.20 |
| Naugard ® 412 S | | | | | | 0.20 | 0.20 | 0.20 |
| Cloisite ® 25A | | | | | | | | 5.00 |

TABLE 33B

Examples and Amounts of Compounds in pph of the composition

| | Example Number | | | | | | | |
|---|---|---|---|---|---|---|---|---|
| Compound | 41 | 42 | 43 | 44 | 45 | 46 | 47 | 48 |
| Nylon 66 | 94.60 | 94.60 | 93.60 | 93.60 | 93.60 | 0.00 | 0.00 | 0.00 |
| Mark ® 135 A | 0.20 | 0.20 | 0.20 | 0.20 | 0.20 | 0.20 | 0.20 | 0.20 |
| Naugard 412 S | 0.20 | 0.20 | 0.20 | 0.20 | 0.20 | 0.20 | 0.20 | 0.20 |
| Epoxy 332 | 0.00 | 0.00 | 1.00 | 1.00 | 1.00 | 0.00 | 0.00 | 0.00 |

TABLE 33B-continued

Examples and Amounts of Compounds in pph of the composition

| Compound | 41 | 42 | 43 | 44 | 45 | 46 | 47 | 48 |
|---|---|---|---|---|---|---|---|---|
| Nylon 6 | | | | | | 94.60 | 94.60 | 94.60 |
| Cloisite ® 25A | | | | | | 5.00 | | |
| Cloisite ® 93A | 5.00 | | 5.00 | | | | 5.00 | |
| Cloisite ® 30B | | 5.00 | | 5.00 | | | | 5.00 |

TABLE 33C

Examples and Amounts of Compounds in pph of the composition

| Compound | 49 | 50 | 51 | 52 | 53 | 54 | 55 | 56 | 57 |
|---|---|---|---|---|---|---|---|---|---|
| Nylon 66 | 92.60 | 73.60 | 69.40 | 57.40 | 49.40 | 46.40 | 65.30 | 61.30 | 0.00 |
| Phenoxy ® PKFE | | | | | | | | 4.00 | |
| Lotader ® 4700 | | | 2.00 | 2.00 | | 2.00 | 4.00 | 4.00 | 2.00 |
| Lotader ® 8900 | | | | | | 3.00 | | | 3.00 |
| Royaltuff ® 485 | | 20.00 | 8.00 | 20.00 | 8.00 | 8.00 | | | 20.00 |
| Corterra ® 200 (PTT) | | | | | | 20.00 | 30.00 | 30.00 | 54.30 |
| Ultranox ® 626 | | | 0.20 | 0.20 | 0.20 | 0.20 | 0.50 | 0.50 | 0.50 |
| ELC 1010 | | | 0.20 | 0.20 | 0.20 | 0.20 | 0.20 | 0.20 | 0.20 |
| Mark 135 A | 0.20 | 0.20 | | | | | | | |
| Naugard ® 412 S | 0.20 | 0.20 | | | | | | | |
| Epoxy 332 | 2.00 | 1.00 | | | | | | | |
| Amodel ® At 1002 | | | 20.00 | 20.00 | 20.00 | 20.00 | | | 20.00 |
| Cloisite ® 30B | 5.00 | 5.00 | | | | | | | |
| HDPE | | | | | 20.00 | | | | |
| AC 540A wax | | | 0.20 | 0.20 | 0.20 | 0.20 | | | |
| Fusa bond P MD-353D | | | | | 2.00 | | | | |

TABLE 34

Physical Properties of Compositions

| Ex. No | Tensile Mod. Mpa | Tensile Str @ Yld Mpa | Tensile Str @ Brk Mpa | Tensile Str at brk (%) | Flex Mod, MPa | Flex Stres Mpa | Izod Impact @ RT | HDT @ 66 psi | HDT @ 264 psi |
|---|---|---|---|---|---|---|---|---|---|
| 33 | 2139 | 68.9 | 49.5 | 25.3 | 2453 | 93.7 | 0.96 | 222 | |
| 34 | 1950 | 68.3 | 63.0 | 15.8 | 2624 | 100.5 | 1.37 | 221 | |
| 35 | 1662 | 68.1 | 62.3 | 13.7 | 2617 | 99.3 | 1.07 | 217 | |
| 36 | 1687 | 60.9 | 52.3 | 21.3 | 2350 | 88.0 | 3.14 | 221 | 61.3 |
| 37 | 1810 | 64.5 | 65.3 | 19.0 | 2443 | 96.6 | 2.75 | 233 | 65.2 |
| 38 | | | | | 2672 | 68.0 | 14.6 | 214 | 62.0 |
| 39 | 1600 | 47.0 | 42.3 | 31.0 | 1641 | 62.3 | 16.2 | 199 | 58.9 |
| 40 | 2220 | 85.8 | 85.8 | 4.3 | 3779 | 128 | 0.69 | | 88.1 |
| 41 | 2560 | 84.0 | 84.0 | 4.1 | 3676 | 126 | 0.69 | | 87.2 |
| 42 | 2248 | 87.7 | 87.7 | 4.8 | 3764 | 128 | 0.60 | | 89.8 |
| 43 | 2136 | 89.3 | 89.3 | 4.8 | 3672 | 131 | 0.86 | | 86.4 |
| 44 | 2136 | 89.4 | 89.4 | 5.0 | 3604 | 129 | 0.84 | | 84.3 |
| 45 | 2224 | 92.3 | 91.7 | 5.3 | 3626 | 131 | 0.78 | | 84.7 |
| 46 | 2249 | 75.1 | 75.0 | 25.0 | 2959 | 110 | 1.05 | | 61.6 |
| 47 | 2134 | 75.3 | 9.6 | 35.0 | 3010 | 107 | 0.93 | | 70.8 |
| 48 | 2183 | 73.6 | 14.6 | 33.0 | 3177 | 112 | 0.95 | | 74.2 |
| 49 | 2745 | 91.6 | 91.6 | 4.5 | 3680 | 129 | 0.48 | | 78.9 |
| 50 | 1876 | 48.0 | 44.6 | 14.5 | 2225 | 75.2 | 3.14 | | 64.5 |
| 51 | 1531 | 65.4 | 57.3 | 15.3 | 2372 | 92.5 | 2.67 | | 70.5 |
| 52 | 1118 | 47.7 | 41.1 | 23.3 | 1720 | 66.8 | 15.2 | 120 | 65.3 |
| 53 | 1049 | 48.4 | 37.2 | 30.5 | 1499 | 61.6 | 2.8 | | 66.7 |
| 54 | 1371 | 55.2 | 52.1 | 10.2 | 2040 | 80.4 | 1.6 | | 66.5 |
| 55 | 1605 | 65.3 | 62.4 | 7.2 | 2308 | 89.9 | 0.6 | | 67.7 |
| 56 | 1617 | 65.2 | 52.4 | 11.5 | 2241 | 89.8 | 1.08 | | 68.3 |
| 57 | 768 | 23.0 | 23.0 | 4.8 | 1032 | 35.1 | 0.86 | | 51.2 |

Examples 4, 31 and 32 were injection molded into plaques and cut into the same shape and thickness to conforming to ASTM specification D 814-95. Organic Vapor Transmission was established per ASTM D 814-95. The results are in Table 35 that shows the weight of the filled vessel sealed with the composition of each example at each corresponding time. The superiority of the composition is demonstrated in Example 32 which shows no loss in weight after reaching equilibrium 96 hours at 40° C. This shows that there was no fuel lost to the atmosphere after reaching equilibrium at 24 hours.

Shrinkage of the material was measured by comparing the dimensions of the mold with the dimensions of the finished cooled part after 24 hrs. Shrinkage was measured in the flow direction and is expressed as a percent of the corresponding mold dimension in Table 35.

TABLE 35

Weight Of Container (gms) and Material Shrinkage

| Sample | Initial Weight @ 23° C. | 24 hrs @ 40° C. | 48 hrs @ 40° C. | 96 hrs @ 40° C. | Shrinkage (%) Flow Direction |
|---|---|---|---|---|---|
| Example 4 | 327.75 | 327.7 | 327.7 | 327.65 | 1.28 |
| Example 31 | 324.30 | 324.25 | 324.20 | 324.20 | 1.15 |
| Example 32 | 322.15 | 322.0 | 322.0 | 322.0 | 1.14 |

Examples 58 through 63 were prepared in the same manner as follows: the main feeder of a ZE 25 twin screw extruder (L/D=44) operated at a rate of 500 r.p.m. and a set temperature profile of 25° C. (feed), 250° C. (Zone 2), 275° C. (Zone 3), 280° C. (Zone 4), 285° C. (Zone 5), 285° C. (Zone 6), 275° C. (Zone 7), 270° C. (Zone 8), 270° C. (Zone 9), 270° C. (Zone 10), 265° C. (Zone 11), 265° C. (die), and the composition noted in Tables 36A, 36B, and 36C were each charged with through the main hopper. The physical properties of the examples are noted in Table 37.

TABLE 36

Examples and Amounts of Compounds in pph of the composition

| | Example Number | | | | | |
|---|---|---|---|---|---|---|
| Compound | 58 | 59 | 60 | 61 | 62 | 63 |
| Nylon 66 | 46.40 | 61.3 | 60.55 | 76.60 | 63.15 | 57.15 |
| Phenoxy ® PKFE | | | | 2.00 | 3.00 | 3.00 |
| Lotader ® 8900 | 3.00 | | 2.00 | | 3.00 | 3.00 |
| Royal tough 485 | 20.00 | 20.00 | | | 22.00 | 22.00 |
| Corterra ® 200 (PTT) | 10.00 | | | | 6.00 | |
| Royal tough ® 498 | 20.00 | | 20.00 | 20.00 | | |
| Ultranox ® or ELC ® 626 | 0.30 | 0.25 | 0.25 | 0.20 | 0.15 | 0.15 |
| ELC ® 1010 | 0.20 | 0.20 | 0.20 | 0.20 | 0.20 | 0.20 |
| Amodel ® At 1002 | | 15.00 | | | | |
| Amodel ® At 1006 | | | | | | 8.00 |
| Cloisite ® 30B | | 3.23 | | | | |
| AC 540A wax | 0.10 | | | | | |
| Polyethylene Terephthalate | | | 15.00 | | | |
| Bynel ® CSX E418 | | | | | 3.00 | |
| Nystlan ® | | | | | 0.30 | 0.30 |
| Black 900 | | | | | 0.20 | 0.20 |

In the case of Example 59, the Cloisite 30B was precompounded into the Nylon 66.

TABLE 37

Physical Properties of Compositions

| Ex. No | Tensile Mod. Mpa | Tensile Str @ Yld Mpa | Tensile Str @ Brk Mpa | Tensile Str at brk (%) | Flex Mod, MPa | Flex Stres Mpa | Izod Impact @ RT | HDT @ 66 psi | HDT @ 264 Psi |
|---|---|---|---|---|---|---|---|---|---|
| 58 | 1191 | 41.0 | 35.8 | 26.9 | 1639 | 62.6 | 12.20 | | 61.3 |
| 59 | 1613 | 51.7 | 45.9 | 21.6 | 1849 | 70.4 | 11.00 | | 61.3 |
| 60 | 1585 | 43.9 | 42.1 | 17.7 | 1732 | 62.5 | 1.99 | | 60.0 |
| 61 | 1505 | 46.1 | 42.9 | 30.3 | 1511 | 59.3 | 13.60 | | 58.4 |
| 62 | 1299 | 38.6 | 37.9 | 47.1 | 1499 | 54.7 | 17.60 | | 74.3 |
| 63 | 1320 | 42.0 | 38.4 | 26.7 | 1520 | 58.0 | 17.30 | | 78.6 |

These examples were additionally analyzed for their ability to absorb components of gasoline. The more the material absorbed over time, the more permeable the composition is expected to be.

As can be seen in Table 38, the non-polyphthalamide polyamide (Ex 61, and 64) absorbs a tremendous amount of material and is therefore expected to have poorer barrier than the composition containing either the polyphthalamide (59) or polyester (58 and 60).

TABLE 38

Weight Gain of Sample (Percent)

| Sample | 7 day | 14 days | 21 days | 28 days |
|---|---|---|---|---|
| 58 | 0.23 | | | 0.55 |
| 59 | 0.27 | | | 0.66 |
| 60 | 0.25 | | | 0.65 |
| 61 | 0.68 | 0.78 | 0.93 | |
| 64 | 1.46 | 2.71 | | 3.61 |

1. A thermoplastic resin composition comprising an aromatic polyester, a polyphthalamide and a compatibilizer.
2. The thermoplastic resin composition as specified in claim 1 which further comprises a second polyamide selected from the group consisting of aliphatic polyamides and partially aromatic polyamides.
3. The thermoplastic resin of claim 2 wherein the polyester is selected from the group consisting of polybutylene terephthalate, polyethylene terephthalate, polytrimethylene terephthalate, polyethylene naphthalate, and polybutylene naphthalate and copolymers thereof.
4. The thermoplastic resin of claim 3 wherein the compatibilizer has at least one functional group selected from the group consisting of hydroxyl groups, carboxylic acid groups, glycidyl groups, maleic anhydride groups, amino groups, siloxane groups or isocyanato groups.
5. The thermoplastic resin of claim 4 wherein the polyphthalamide is present at a level within the range of 2 weight percent to 93 weight percent on the basis of polyphthalamide, the second polyamide, the polyester and the compatibilizer.
6. The thermoplastic resin of claim 5 wherein the aromatic polyester is present at a level within the range of 3 weight percent to 30 weight percent on the basis of polyphthalamide, the second polyamide, the polyester and the compatibilizer.
7. The thermoplastic resin as specified in claim 6 wherein the second polyamide is present at a level within the range of 40 to 75 weight percent on the basis of polyphthalamide, the second polyamide, the polyester and the compatibilizer.

8. The thermoplastic resin as specified in claim 7 wherein the polyester is polytrimethylene terephthalate.

9. The thermoplastic resin as specified in claim 7 wherein the polyester resin is polybutylene terephthalate.

10. The thermoplastic resin as specified in claim 7 wherein the second polyamide is selected from the group consisting of nylon-6 and nylon-6,6.

11. The thermoplastic resin as specified in claim 7, which is further comprised of a glass fiber, wherein said glass fiber is present at a level from 1 php to 70 php.

12. A container for organic liquids having a contained volume wherein said container is comprised of at least one wall, an inlet, an outlet, wherein the wall is comprised of the thermoplastic composition specified in claim 7.

13. The container of claim 12, wherein the wall of the container is of a monolayer construction.

14. A container for organic liquids having a contained volume wherein said container is comprised of at least one wall, wherein said container is connected with an energy conversion device in such a manner that organic liquid stored in the container is capable of being transferred from the container to the energy conversion device and wherein the wall is comprised of the thermoplastic composition specified in claim 7.

We claim:

1. A container for organic liquids having a contained volume wherein said container is a fuel tank comprised of at least one wall, an inlet, an outlet, wherein the wall is comprised of a thermoplastic composition which includes an aromatic polyester selected from the group consisting of polybutylene terephthalate, polyethylene terephthalate, polytrimethylene terephthalate, polyethylene naphthalate, and polybutylene naphthalate and copolymers thereof, a first polyamide which is a polyphthalamide, a compatibilizer having at least one functional group selected from the group consisting of hydroxyl groups, carboxylic acid groups, glycidyl groups, maleic anhydride groups, amino groups, siloxane groups and isocyanato groups and a second polyamide selected from the group consisting of aliphatic polyamides and partially aromatic polyamides; wherein the aromatic polyester is present at a level within the range of about 3 weight percent to about 30 weight percent on the basis of the polyphthalamide, the second polyamide, the polyester and the compatibilizer; wherein the second polyamide is present at a level within the range of about 40 to about 75 weight percent on the basis of the polyphthalamide, the second polyamide, the polyester and the compatibilizer and wherein the polyphthalamide is present at level of at least about 3 weight percent on the basis of the polyphthalamide, the second polyamide, the polyester and the compatibilizer.

2. The container of claim 1, wherein the wall of the container is of a monolayer construction.

3. The container of claim 1, wherein the inlet is capable of receiving a cap.

4. The container of claim 2, wherein the inlet is capable of receiving a cap.

5. The container of claim 1, wherein the container is manufactured by blow molding.

6. The container of claim 1, wherein the container is manufactured by rotational molding.

7. The container of claim 1, wherein the container is manufactured by injection molding.

8. The container of claim 1, wherein the container has a weld seam.

9. The container of claim 1, wherein the container has a seam where the two halves of the mold used to make the container have come together.

10. The container of claim 2, wherein the container is manufactured by blow molding.

11. The container of claim 2, wherein the container is manufactured by rotational molding.

12. The container of claim 2, wherein the container is manufactured by injection molding.

13. The container of claim 2, wherein the container has a weld seam.

14. The container of claim 2, wherein the container has a seam where the two halves of the mold used to make the container have come together.

15. The container of claim 4, wherein the container is manufactured by blow molding.

16. The container of claim 4, wherein the container is manufactured by rotational molding.

17. The container of claim 4, wherein the container is manufactured by injection molding.

18. The container of claim 4, wherein the container has a weld seam.

19. The container of claim 4, wherein the container has a seam where the two halves of the mold used to make the container have come together.

* * * * *